United States Patent
Langoju et al.

(10) Patent No.: US 12,131,446 B2
(45) Date of Patent: Oct. 29, 2024

(54) SELF-SUPERVISED DEBLURRING

(71) Applicant: GE Precision Healthcare LLC, Milwaukee, WI (US)

(72) Inventors: Rajesh Veera Venkata Lakshmi Langoju, Bengaluru (IN); Prasad Sudhakara Murthy, Bengaluru (IN); Utkarsh Agrawal, Bengaluru (IN); Bhushan D. Patil, Pune (IN); Bipul Das, Chennai (IN)

(73) Assignee: GE Precision Healthcare LLC, Waukesha, WI (US)

( * ) Notice: Subject to any disclaimer, the term of this patent is extended or adjusted under 35 U.S.C. 154(b) by 538 days.

(21) Appl. No.: 17/368,534

(22) Filed: Jul. 6, 2021

(65) Prior Publication Data
US 2023/0013779 A1  Jan. 19, 2023

(51) Int. Cl.
*G06T 5/73* (2024.01)
*G06N 20/00* (2019.01)
(Continued)

(52) U.S. Cl.
CPC ............... *G06T 5/73* (2024.01); *G06N 20/00* (2019.01); *G06T 3/4053* (2013.01); *G06T 5/20* (2013.01); *G06T 2207/20081* (2013.01)

(58) Field of Classification Search
CPC ......... G06T 5/003; G06T 3/4053; G06T 5/20; G06T 2207/20081; G06T 7/0012;
(Continued)

(56) References Cited

U.S. PATENT DOCUMENTS

2022/0051371 A1*  2/2022  Hota .................... G06T 5/006

FOREIGN PATENT DOCUMENTS

WO  WO-2021176899 A1 *  9/2021  ........... G06F 18/217
WO  WO-2022103400 A1 *  5/2022  ............. G06T 5/003

OTHER PUBLICATIONS

P. Liu, J. Janai, M. Pollefeys, T. Sattler and A. Geiger, "Self-Supervised Linear Motion Deblurring," in IEEE Robotics and Automation Letters, vol. 5, No. 2, pp. 2475-2482, Apr. 2020, doi: 10.1109/LRA.2020.2972873. (Year: 2020).*
(Continued)

*Primary Examiner* — Sumati Lefkowitz
*Assistant Examiner* — Aaron Joseph Sorrin
(74) *Attorney, Agent, or Firm* — Amin, Turocy & Watson, LLP

(57) ABSTRACT

Systems/techniques that facilitate self-supervised deblurring are provided. In various embodiments, a system can access an input image generated by an imaging device. In various aspects, the system can train, in a self-supervised manner based on a point spread function of the imaging device, a machine learning model to deblur the input image. More specifically, the system can append to the model one or more non-trainable convolution layers having a blur kernel that is based on the point spread function of the imaging device. In various aspects, the system can feed the input image to the model, the model can generate a first output image based on the input image, the one or more non-trainable convolution layers can generate a second output image by convolving the first output image with the blur kernel, and the system can update parameters of the model based on a difference between the input image and the second output image.

20 Claims, 18 Drawing Sheets

(51) Int. Cl.
*G06T 3/4053* (2024.01)
*G06T 5/20* (2006.01)
(58) Field of Classification Search
CPC . G06T 2207/10072; G06T 2207/20201; G06T 5/70; G06N 20/00; G06N 3/0464; G06N 3/0895; G06N 3/08; G06V 10/82
See application file for complete search history.

(56) References Cited

OTHER PUBLICATIONS

D. Adke, A. Karnik, H. Berman and S. Mathi, "Detection and Blur-Removal of Single Motion Blurred Image using Deep Convolutional Neural Network," 2021 International Conference on Artificial Intelligence and Computer Science Technology (ICAICST), Yogyakarta, Indonesia, 2021, pp. 79-83 (Year: 2021).*
H. Chen, et al., "Reblur2Deblur: Deblurring videos via self-supervised learning," in 2018 IEEE International Conference on Computational Photography (ICCP), Pittsburgh, PA, USA, 2018 pp. 1-9. doi: 10.1109/ICCPHOT.2018.8368468 (Year: 2018).*
WO-2021176899-A1—Original and English Translation (Year: 2021).*
Son, H. et al. | Fast non-blind deconvolution via regularized residual networks with long/short skip connections. In 2017 IEEE International Conference on Computational Photography, ICCP 2017, Stanford, CA, USA, May 12-14, 2017. pp. 23-32, IEEE Computer Society, 2017.
Schuler, C. J. et al. | Learning to deblur. IEEE PAMI 38(7), 1439{1451 (2016), 23 pages.
Hradis, M. et al. | Convolutional neural networks for direct text deblurring. BMVC, Jun. 28, 2015, 13 pages.
Foster, Manus., "An Application of the Wiener-kolmogorov Smoothing Theory to Matrix Inversion", Journal of the Society for Industrial and Applied Mathematics, vol. 9, No. 3, Sep. 1961, pp. 387-392.
Richardson, Willam Hadley.,"Bayesian-based Iterative Method of Image Restoration", Journal of the Optical Society of America, vol. 62, No. 1, Jan. 1972, pp. 55-59.
Lucy, L.B, "An Iterative Technique for the Rectification of Observed Distributions", The Astronomical Journal, vol. 79, No. 6, dated Jun. 1974, pp. 745-754.
Fish et al., "Blind Deconvolution by Means of the Richardson-lucy Algorithm", Journal of the Optical Society of America A, vol. 12, No. 1, Jan. 1995, pp. 58-65.
Neubauer, A., "Tikhonov regularisation for non-linear ill-posed problems: optimal convergence rates and finite-dimensional approximation". Inverse Problems 5 (1989), 18 pages.
Ingaramo et al., "Richardson-Lucy Deconvolution as a General Tool for Combining Images with Complementary Strengths", ChemPhysChem, vol. 15, No. 4, Mar. 17, 2014, pp. 794-800.
Biggs et al., "Acceleration of Iterative Image Restoration Algorithms", Applied Optics, vol. 36, No. 8, Mar. 10, 1997, pp. 1766-1775.
Holmes et al., "Light Microscopic Images Reconstructed by Maximum Likelihood Deconvolution", Handbook of Biological Confocal Microscopy, Springer, 1995, pp. 389-402.
Dey et al., "Richardson-Lucy Algorithm with Total Variation Regularization for 3D Confocal Microscope Deconvolution", Microscopy Research & Technique, vol. 69, 2006, pp. 260-266.
Vonesch et al., "A Fast Multilevel Algorithm for Wavelet-regularized Image Restoration", IEEE Transaction on Image Processing, vol. 18, No. 3, Mar. 3, 2009, pp. 509-523.
Danielyan et al., "Bm3d Frames and Variational Image Deblurring", IEEE Transactions on Image Processing, vol. 21, No. 4, Jun. 30, 2012, 13 pages.
Krishnan et al., "Fast Image Deconvolution Using Hyper-laplacian Priors", Advances in Neural Information Processing Systems, vol. 22, Curran Associates Inc., 2009, 9 pages.
Xue et al., "Multi-wiener SURE-LET Deconvolution", IEEE Transaction on Image Processing, vol. 22, No. 5, May 2013, pp. 1954-1968.
Lefkimmiatis et al., "Poisson Image Reconstruction With Hessian Schatten-norm Regularization", IEEE Transaction on Image Processing, vol. 22, No. 11, Nov. 2013, pp. 4314-4327.
Son et al., "Fast Non-blind Deconvolution via Regularized Residual Networks With Long/short Skip-connections," IEEE International Conference on Computational Photography ICCP, IEEE, Stanford, CA, dated 2017, 10 pages.
Xu et al., "Deep Convolutional Neural Network for Image Deconvolution", Advances in Neural Information Processing Systems, vol. 27, Curran Associates Inc., dated 2014, pp. 1790-1798.
Hradis et al., "Convolutional Neural Networks for Direct Text Deblurring", Proceedings of the British Machine Vision Conference , BMVA Press, dated Sep. 2015, 13 pages.
Sun et al., "Learning a Convolutional Neural Network for Non-uniform Motion Blur Removal", 2015 IEEE Conference on Computer Vision and Pattern Recognition, dated 2015, pp. 769-777.
Senouf et al., "Self-supervised Learning of Inverse Problem Solvers in Medical Imaging", Domain Adaptation and Representation Transfer and Medical Image Learning with Less Labels and Imperfect Data, Springer International Publishing, dated 2019, 10 pages.
Kabanikhin, S.I., "Definitions and examples of inverse and ill-posed problems". J. Inv. Ill-Posed Problems 16 (2008), 317-357, 41 pages.

\* cited by examiner

SELF-SUPERVISED DEBLURRING

TECHNICAL FIELD

The subject disclosure relates generally to image deblurring, and more specifically to self-supervised deblurring.

BACKGROUND

Images generated by imaging equipment can suffer from low resolution, otherwise known as blurring. It can be desirable to reduce and/or remove blurring from such images. Existing techniques for ameliorating blurring are usually iterative during inference, meaning that such techniques can be highly time-consuming. Moreover, existing techniques that are non-iterative during inference require voluminous amounts of annotated training data, which might be unavailable and/or otherwise impracticable to obtain.

Accordingly, systems and/or techniques that can address one or more of these technical problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate self-supervised deblurring are described.

According to one or more embodiments, a system is provided. The system can comprise a computer-readable memory that can store computer-executable components. The system can further comprise a processor that can be operably coupled to the computer-readable memory and that can execute the computer-executable components stored in the computer-readable memory. In various embodiments, the computer-executable components can comprise a receiver component. In various aspects, the receiver component can access an input image generated by an imaging device. In various instances, the computer-executable components can comprise a training component. In various cases, the training component can train, in a self-supervised manner based on a point spread function of the imaging device, a machine learning model to deblur the input image. In various aspects, the training component can append one or more non-trainable convolution layers to the machine learning model, where the one or more non-trainable convolution layers can have a blur kernel that is based on the point spread function of the imaging device. In various instances, the training component can feed the input image to the machine learning model, the machine learning model can generate a first output image based on the input image, the one or more non-trainable convolution layers can generate a second output image by convolving the first input image with the blur kernel, and the training component can update parameters of the machine learning model based on a difference between the input image and the second output image.

According to one or more embodiments, the above-described system can be implemented as a computer-implemented method and/or a computer program product.

DETAILED DESCRIPTION

Figure 1:
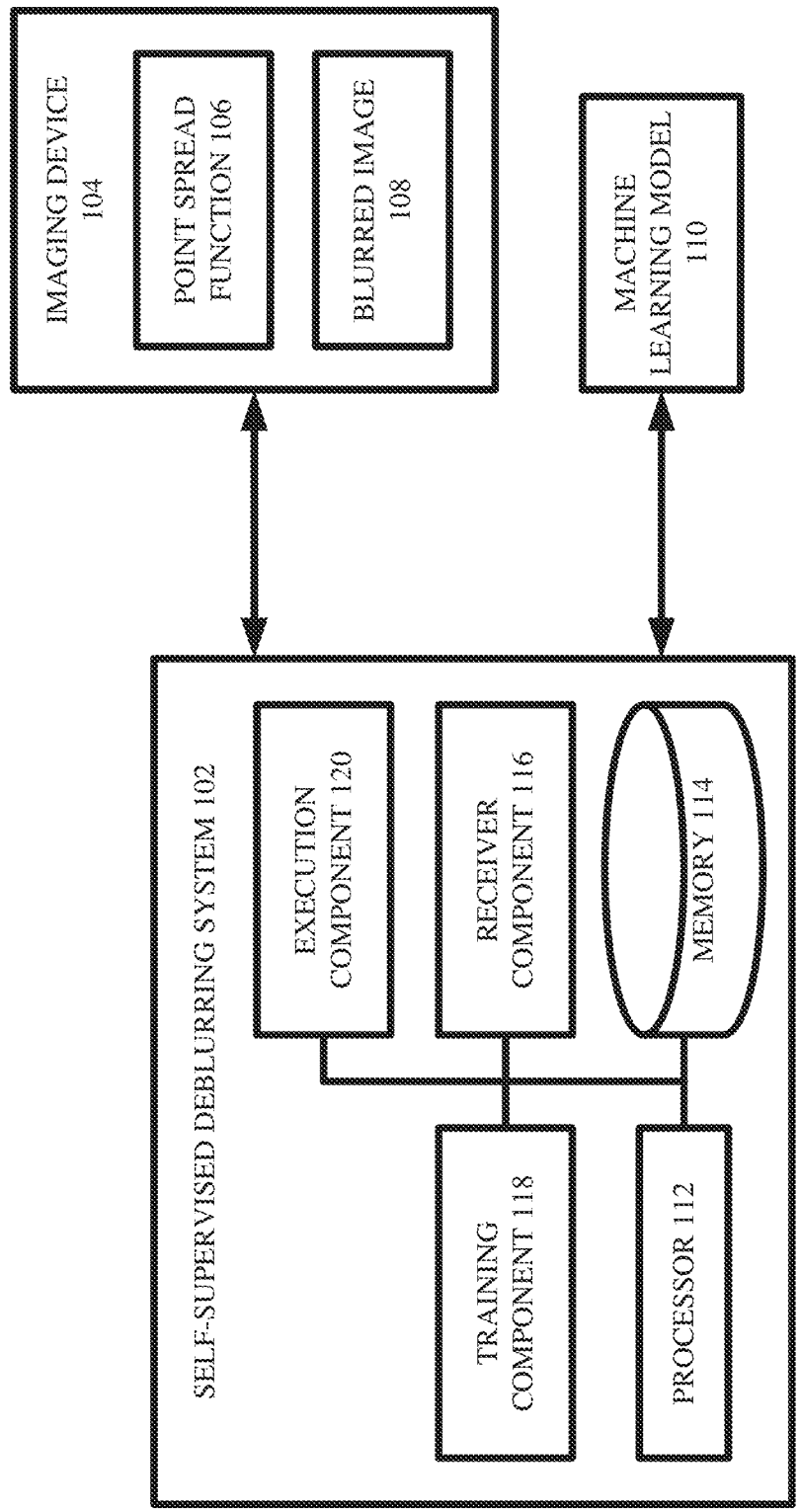
FIG. 1 illustrates a block diagram of an example, non-limiting system that facilitates self-supervised deblurring in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Images generated by imaging equipment can suffer from low resolution, otherwise known as blurring and/or derating. Blurring can be a particularly troublesome issue with respect to medical images and medical imaging equipment (e.g., computed tomography (CT) scanners, magnetic resonance imaging (MRI) scanners, positron emission tomography (PET) scanners, ultrasound scanners). Indeed, blurring in medical images can prevent small and/or fine anatomical structures from being clearly visually depicted, which can make it more difficult for diagnoses and/or prognoses to be accurately inferred (e.g., by clinicians and/or medical machine learning models) from such medical images. In contrast, medical images that have less blurring, and thus higher resolutions, can more clearly visually depict small and/or fine anatomical structures, which can make it easier for diagnoses and/or prognoses to be accurately inferred from such medical images. Accordingly, it can be desirable to reduce and/or remove image blurring.

Image blurring can have various causes. In some cases, blurring in an image can be caused by the imaging device that is used to create the image. For example, image blurring can occur when the imaging device has photo-detectors that are too far away from and/or too large in relation to the structures and/or objects that are desired to be captured in the image. As another example, image blurring can occur based on how the imaging device is configured to operate while capturing the image (e.g., fast pitch CT acquisition techniques can cause blurring, fast switching of dual energy CT scanners can cause blurring). In other cases, blurring in an image can be caused by post-processing of the image. For example, image blurring can result from noise reduction techniques that implement thick image slices and/or large pixels/voxels. As another example, image blurring can result from image reconstruction techniques.

Various hardware modifications can be implemented to prevent an image from being blurred in the first place and/or to otherwise constrain the amount of blurring that manifests in the image. For example, with respect to CT scanners, dicing photo-detector cells into smaller sizes and/or dynamically deflecting X-ray focal spots can be implemented to reduce blurring of resultant CT images. However, such hardware modifications can be prohibitively expensive (e.g., require much money and time to implement).

In contrast to hardware modifications, various post-processing techniques can be applied to a blurred image, so as to reduce the amount of blur in the image. Such post-processing techniques, which can be referred to as deblurring techniques, can be much less expensive than hardware modifications.

Various existing deblurring techniques include numerical schemes that facilitate deconvolution of images. Such numerical schemes can, for example, include Wiener deconvolution, Richardson-Lucy's algorithm, deconvolution utilizing the Tikhonov regularizer, statistical blind deconvolution methods, and/or deconvolution by the alternating direction method of multipliers. Unfortunately, such numerical schemes are iterative during inference, which means that they can be highly time-consuming and/or slow. Moreover, such numerical schemes often require meticulous manual tuning of various parameters in order to achieve acceptable deblurring.

Various other existing deblurring techniques include deep learning methods that learn to produce high-resolution (e.g., deblurred) images from low-resolution (e.g., blurred) images. However, such existing deep learning methods are generally supervised or semi-supervised, which means that they require many low-resolution and high-resolution pairs of images to facilitate training (e.g., consider a training dataset comprising multiple blurred images; for each blurred image in the training dataset, a corresponding ground truth deblurred image can be required to facilitate supervised training). Unfortunately, it is often the case in practice that blurred images do not have such known deblurred counterparts available. In these cases, such existing deep learning methods cannot be implemented.

Accordingly, systems and/or techniques that can facilitate deblurring without iterating during inference and/or without requiring deblurred ground truths can be desirable.

Various embodiments of the subject innovation can address one or more of these technical problems. One or more embodiments described herein include systems, computer-implemented methods, apparatus, and/or computer program products that can facilitate self-supervised deblurring. In various aspects, embodiments of the subject innovation can be considered as a computerized tool (e.g., any suitable combination of computer-executable hardware and/or computer-executable software) that can electronically train, in a self-supervised fashion, a deep learning model to deblur low-resolution images produced by an imaging device. In various instances, the training as described herein can be considered as self-supervised, because such training does not depend upon annotated ground truths. Instead, such training can depend upon a point spread function of the imaging device, where the point spread function describes and/or characterizes how the imaging device blurs a point source of light. As the inventors of various embodiments of the subject innovation recognized, a blurred and/or low-resolution image can be considered as the result of applying a corresponding point spread function to a corresponding deblurred and/or high-resolution image. Accordingly, the corresponding deblurred and/or high resolution image can be obtained by applying an inverse of the point spread function to the blurred and/or low-resolution image. In various cases, the computerized tool described herein can train the deep learning model to learn the inverse of the point spread function of the imaging device, without utilizing known ground truths. Moreover, once trained, the deep learning model can deblur images generated by the imaging device, without iterating during inference. Because the deep learning model as described herein can be trained without known ground truths and can operate without iteration during inference, the deep learning model constitutes a concrete and tangible technical improvement over existing deblurring techniques.

In various embodiments, the computerized tool described herein can comprise a receiver component, a training component, and an execution component.

In various aspects, there can be an imaging device that can generate a set of blurred images. In various instances, the imaging device can be any suitable imaging device deployed in any suitable operating environment (e.g., can be a CT scanner that produces CT images, an MRI scanner that produces MRI images, a PET scanner that produces PET images, an ultrasound scanner that produces ultrasound images, a visible-spectrum camera that produces visible-spectrum images). In various cases, the set of blurred images can include any suitable number of blurred images. In various aspects, it can be desired to train a deep learning model on the set of blurred images, so that the deep learning model learns to deblur images generated by the imaging device. In various cases, the deep learning model can have any suitable neural network architecture (e.g., any suitable number of layers, any suitable numbers of neurons in various layers, any suitable activation functions, any suitable interneuron connectivity patterns).

In various embodiments, the receiver component of the computerized tool can electronically receive and/or otherwise electronically access a blurred image from the set of blurred images generated by the imaging device. In various cases, the receiver component can electronically retrieve the blurred image from any suitable centralized and/or decentralized data structure (e.g., graph data structure, relational data structure, hybrid data structure), whether remote from and/or local to the receiver component. In various other cases, the receiver component can electronically retrieve the blurred image from the imaging device.

In various embodiments, the training component of the computerized tool can electronically train the deep learning model, in a self-supervised manner based on a point spread function of the imaging device, to deblur the blurred image. More specifically, the training component can electronically append a non-trainable convolution layer to the end of the deep learning model. In various aspects, the non-trainable convolution layer can be configured to model and/or otherwise implement the blur caused by the point spread function of the imaging device. In particular, the non-trainable convolution layer can have a kernel/filter, the dimensions and/or elements of which can be based on the point spread function of the imaging device. For instance, in some cases, the dimensions and/or elements of the kernel/filter can be configured so as to mimic the point spread function of the imaging device. In other cases, the dimensions and/or elements of the kernel/filter can be configured so as to mimic a residual difference between the point spread function of the imaging device and another point spread function of a different, higher-resolution imaging device. In any case, the non-trainable convolution layer can be configured to receive as input a given image and to produce as output a blurred version of the given image, by convolving the given image with the kernel/filter. If the dimensions and/or elements of the kernel/filter are configured to mimic the point spread function of the imaging device, convolving the given image with the kernel/filter can be considered as equivalent to applying the point spread function of the imaging device to the given image. On the other hand, if the dimensions and/or elements of the kernel/filter are configured to mimic a residual difference between the point spread function of the imaging device and another point spread function of a different, higher-resolution imaging device, convolving the given image with the kernel/filter can be considered as equivalent to applying the residual difference between such point spread functions to the given image.

In various aspects, the training component can leverage the non-trainable convolution layer to train the deep learning model on the blurred image obtained by the receiver component. For instance, the training component can feed the blurred image obtained by the receiver component to the deep learning model. In various cases, the deep learning model can output an estimated deblurred image based on the blurred image. Note that, if the deep learning model has so far undergone no and/or little training, the estimated deblurred image can be quite inaccurate. In any case, the estimated deblurred image can be received by the non-trainable convolution layer. In various aspects, the non-trainable convolution layer can output a pseudo-blurred image based on the estimated deblurred image, by convolving the estimated deblurred image with the kernel/filter that is based on the point spread function of the imaging device. In other words, the non-trainable convolution layer can generate the pseudo-blurred image by applying the point spread function of the imaging device (and/or a residual difference between the point spread function of the imaging device and another point spread function of a different, higher-resolution imaging device) to the estimated deblurred image. Accordingly, the training component can update, via backpropagation, internal parameters (e.g., weights, biases) of the deep learning model based on an error between the pseudo-blurred image outputted by the nontrainable convolution layer and the blurred image obtained by the receiver component. In cases where the non-trainable convolution layer is configured to mimic and/or approximate the blur caused by the residual difference between the point spread function of the imaging device and another point spread function of a different, higher-resolution imaging device, the error between the pseudo-blurred image and the blurred image can be offset by a point spread function loss term that is based on shape differences (e.g., monotonicity differences, full-width-half-maximum differences, kurtosis differences, Fourier/wavelet differences) between the point spread function and the other point spread function. In any case, the goal can be to minimize the error between the blurred image generated by the imaging device and the pseudo-blurred image generated by the non-trainable convolution layer. Such error can be minimized as the deep learning model learns to more accurately generate the estimated deblurred image.

In various aspects, the receiver component and/or the training component can repeat this procedure for each of the blurred images in the set of blurred images generated by the imaging device, which can cause the parameters of the deep learning model to be iteratively optimized, such that the deep learning model knows how to accurately deblur (e.g., deconvolve) the actual blurred images generated by the imaging device. Note that such training does not require having any ground truth deblurred versions of the actual blurred images generated by the imaging device, but that such training nevertheless includes backpropagation. Accordingly, such training can be referred to as self-supervised.

Alternatively, in various embodiments, the training component can function as follows. In various cases, the training component can append the non-trainable convolution layer to the end of the deep learning model, as mentioned above. Furthermore, the training component can, in various aspects, append a duplicate of the deep learning model to the end of the non-trainable convolution layer, where there can be full weight sharing between the machine learning model and the duplicate of the machine learning model. In such case, the deep learning model, the non-trainable convolution layer, and the duplicate of the deep learning model can be considered as being coupled in series.

In various aspects, the training component can leverage both the non-trainable convolution layer and the duplicate of the deep learning model to train the deep learning model on the blurred image obtained by the receiver component. For instance, just as above, the training component can feed the blurred image obtained by the receiver component to the deep learning model, and the deep learning model can output an estimated deblurred image based on the blurred image. Moreover, the estimated deblurred image can be received by the non-trainable convolution layer, and the non-trainable convolution layer can output a pseudo-blurred image based on the estimated deblurred image, by convolving the estimated deblurred image with the kernel/filter that is based on the point spread function of the imaging device.

Furthermore, the pseudo-blurred image can be received by the duplicate of the deep learning model. In various cases, the duplicate of the deep learning model can generate a re-estimated deblurred image based on the pseudo-blurred image. Accordingly, the training component can update, via backpropagation, internal parameters of the deep learning model based on a first error between the pseudo-blurred image outputted by the non-trainable convolution layer and the blurred image obtained by the receiver component, and based on a second error between the estimated deblurred image outputted by the deep learning model and the re-estimated deblurred image outputted by the duplicate of the deep learning model. Again, in cases where the non-trainable convolution layer is configured to mimic and/or approximate the blur caused by the residual difference between the point spread function of the imaging device and another point spread function of a different, higher-resolution imaging device, the first error can be offset by a point spread function loss term that is based on shape differences (e.g., monotonicity differences, full-width-half-maximum differences, kurtosis differences, Fourier/wavelet differences) between the point spread function and the other point spread function. In any case, the goal can be to minimize the first error between the blurred image generated by the imaging device and the pseudo-blurred image generated by the non-trainable convolution layer, as well as to minimize the second error between the estimated deblurred image generated by the deep learning model and the re-estimated deblurred image generated by the duplicate of the deep learning model. Such errors can be minimized as the deep learning model learns to more accurately generate the estimated deblurred image. Once the deep learning model is updated with new parameters, such new parameters can be copied in the duplicate of the deep learning model (e.g., full weight sharing). In some cases, utilizing both the first error and the second error can help to expedite training of the deep learning model, as opposed to utilizing only the first error alone.

In any case, the training component can avoid altering and/or updating the kernel/filter of the non-trainable convolution layer once the kernel/filter is configured based on the point spread function of the imaging device, hence the phrase "non-trainable."

In various embodiments, the execution component of the computerized tool can electronically execute and/or deploy the deep learning model in any suitable context and/or environment, once the deep learning model has been trained. That is, the execution component can feed to the deep learning model any suitable image generated by the imaging device, and the deep learning model can output a deblurred version of that image.

Note that, once trained, the deep learning model can receive as input any given image generated by the imaging device and can produce as output a deblurred version of that given image, without requiring iteration. That is, the deep learning model can function noniteratively during inference. Moreover, as explained above, the training component can train the deep learning model, without relying on any annotated ground truths. Instead, the training component can train the deep learning model by implementing the non-trainable convolution layer whose kernel/filter is configured based on the point spread function of the imaging device and/or based on a residual difference between the point spread function of the imaging device and another point spread function of a higher-resolution imaging device. Furthermore, note that, if the non-trainable convolution layer is configured to mimic and/or approximate the blur caused by the point spread function of the imaging device, the deblurred version of the given image can be considered as not having any blur. That is, the deep learning model can be considered as being able to remove an entire blur caused by the imaging device. On the other hand, if the nontrainable convolution layer is instead configured to mimic and/or approximate the blur caused by the residual difference between the point spread function of the imaging device and the other point spread function of the higher-resolution imaging device, the deblurred version of the given image can have some residual blur that is less than the blur exhibited by the given image. That is, the deep learning model can be considered as being able to remove a portion, but not an entirety, of the blur caused by the imaging device.

In summary, the computerized tool described herein can facilitate the self-supervised training of a deblurring model that does not iterate during inference. Specifically, the computerized tool can leverage a convolution layer that is configured to mimic, model, and/or otherwise implement the point spread function of an imaging device. Such convolution layer can be implemented to cyclically regularize the deblurring model in the absence of annotated ground truths. In other words, in the absence of annotated ground truths, there can be no available high-resolution version of a given low-resolution image generated by the imaging device. In various cases, the computerized tool can feed the low-resolution image to the deblurring model, which can cause the deblurring model to output an estimated high-resolution image, where the estimated high-resolution image can be considered as the inferred deblurred version of the low-resolution image. Since there is no annotated ground truth, a loss/error function cannot be computed based on the estimated high-resolution image when existing techniques are implemented. However, the convolution layer of the subject innovation can solve this issue. Specifically, the convolution layer can receive the estimated high-resolution image outputted by the deblurring model, and can output a pseudo-low-resolution image by applying the point spread function of the imaging device (and/or a residual difference between the point spread function of the imaging device and another higher-resolution point spread function) to the estimated high-resolution image. Now, an error/loss can be computed between the actual low-resolution image and the pseudo-low-resolution image (if the convolution layer is based on a residual difference between two point spread functions, such error/loss can be offset by shape differences between the two point spread functions, such as monotonicity, kurtosis, full-width-half-maximum, and/or Fourier/wavelet). Moreover, such error gets smaller as the estimated high-resolution image becomes more accurate. Accordingly, the computerized tool can apply backpropagation to the deep learning model based on such error/loss. By repeating this training procedure for any suitable number and/or sizes of batches and/or epochs, the deblurring model can learn to generate more accurate estimated high-resolution (e.g., deblurred) images. Again, such training procedure does not rely on annotated ground truths. Additionally, once trained, the deblurring model can function without iterating during inference. Thus, various embodiments of the invention are a significant improvement over existing deblurring techniques.

Various embodiments of the subject innovation can be employed to use hardware and/or software to solve problems that are highly technical in nature (e.g., to facilitate self-supervised deblurring), that are not abstract and that cannot be performed as a set of mental acts by a human. Further, some of the processes performed can be performed by a specialized computer (e.g., deep learning model, non-trainable convolution layer) for carrying out defined tasks related to self-supervised deblurring. For example, such defined tasks can include: accessing, by a device operatively coupled to a processor, an input image generated by an imaging device; and training, by the device and in a self-supervised manner based on a point spread function of the imaging device, a machine learning model to deblur the input image; wherein the training the machine learning model comprises appending, by the device, one or more non-trainable convolution layers to the machine learning model, wherein the one or more non-trainable convolution layers have a blur kernel that is based on the point spread function of the imaging device.

Such defined tasks are not performed manually by humans. Indeed, neither the human mind nor a human with pen and paper can electronically receive an image generated by an imaging device, electronically leverage a point spread function of the imaging device to train, via backpropagation and without annotated ground truths, a deep learning model to deblur the image, and/or electronically append a convolution layer to the end of the deep learning model, where the kernel/filter of the convolution layer is based on the point spread function of the imaging device. Instead, various embodiments of the subject innovation are inherently and inextricably tied to computer technology and cannot be implemented outside of a computing environment (e.g., embodiments of the subject innovation constitute a computerized tool that can train a deep learning model to deblur images without relying upon annotated ground truths; such a computerized tool cannot be practicably implemented in any sensible way without computers).

Moreover, various embodiments of the subject innovation can integrate into a practical application various teachings described herein relating to the field of image deblurring. As explained above, existing deblurring techniques either iterate during inference and/or require voluminous amounts of annotated ground truths. In contrast, various embodiments of the subject innovation can include a computerized tool that can train a deep learning model to deblur images generated by a particular imaging device, without requiring annotated ground truths. Specifically, various embodiments of the subject innovation can leverage a non-trainable convolution layer, whose kernel/filter is configured to mimic (and/or is otherwise based on) the point spread function of the particular imaging device. In the absence of an annotated ground truth, existing techniques offer no error/loss function that can be used to drive backpropagation. However, when various embodiments of the subject innovation are implemented, the lack of an annotated ground truth can be overcome by the non-trainable convolution layer. Specifically, the deep learning model can deblur an image generated by the particular imaging device, and the non-trainable convolution layer can re-blur the deblurred image produced by the deep learning model using the point spread function of the imaging device and/or using a residual difference between the point spread function of the imaging device and a higher-resolution point spread function. Accordingly, an error/loss function can be computed based on the difference between the original image generated by the particular imaging device and the re-blurred image produced by the non-trainable convolution layer. If the non-trainable convolution layer is configured to re-blur images according to a residual difference between two point spread functions, such error/loss function can be additively offset a shape loss term that captures one or more shape differences (e.g., monotonicity differences, kurtosis differences, full-width-half-maximum differences, Fourier/wavelet differences) between the two point spread functions. In any case, by minimizing such error/loss through backpropagation, the deep learning model can be trained to accurately deblur (e.g., deconvolve) images produced by the particular imaging device. Unlike existing techniques, such training can implement backpropagation without requiring annotated ground truths (hence the phrase "self-supervised"). Also unlike existing techniques, the deep learning model trained in such a self-supervised fashion can operate non-iteratively during inference. Accordingly, various embodiments of the subject innovation can improve the training and/or performance of deblurring models, which is a concrete and tangible technical improvement, and which clearly constitutes a useful and practical application of computers.

Furthermore, various embodiments of the subject innovation can control real-world tangible devices based on the disclosed teachings. For example, various embodiments of the subject innovation can electronically update parameters of a real-world deep learning deblurring model.

It should be appreciated that the herein figures and description provide non-limiting examples of the subject innovation and are not necessarily drawn to scale.

FIG. 1 illustrates a block diagram of an example, non-limiting system 100 that can facilitate self-supervised deblurring in accordance with one or more embodiments described herein. As shown, a self-supervised deblurring system 102 can be electronically integrated, via any suitable wired and/or wireless electronic connections, with an imaging device 104 and/or with a machine learning model 110.

In various aspects, the imaging device 104 can be any suitable type of imaging equipment and/or modality that can electronically generate a blurred image 108. As an example, the imaging device 104 can be any suitable CT scanner, and the blurred image 108 can be any suitable CT image produced and/or captured by the CT scanner. As another example, the imaging device 104 can be any suitable MRI scanner, and the blurred image 108 can be any suitable MRI image produced and/or captured by the MRI scanner. As still another example, the imaging device 104 can be any suitable PET scanner, and the blurred image 108 can be any suitable PET image produced and/or captured by the PET scanner. As yet another example, the imaging device 104 can be any suitable ultrasound scanner, and the blurred image 108 can be any suitable ultrasound image produced and/or captured by the ultrasound scanner. As even another example, the imaging device 104 can be any suitable visible-spectrum camera, and the blurred image 108 can be any suitable visible-spectrum image captured by the visible-spectrum camera. In various other cases, the imaging device 104 can be any suitable type of multi-image system (e.g., can be a multi-energy imaging system, can be a multi-material imaging system).

In various aspects, the imaging device 104 can be associated with a point spread function 106. In various cases, the point spread function 106 can represent, define, characterize, and/or otherwise indicate how the imaging device 104 responds to a point source of light. More specifically, the point spread function 106 can be considered as the spatial domain version of the optical transfer function implemented by the imaging device 104. In other words, the point spread function 106 can be considered as quantifying how the imaging device 104 blurs images that it captures and/or generates. As those having ordinary skill in the art will appreciate, the point spread function 106 of the imaging device 104 can, in various instances, be known. For example, the point spread function 106 of the imaging device 104 can, in various aspects, be experimentally estimated based on the characteristics, properties, and/or settings of the imaging device 104.

In various instances, the blurred image 108 can depict any suitable object and/or objects as desired. For example, the blurred image 108 can depict one or more anatomical structures and/or portions of anatomical structures (e.g., can depict any suitable view of a patient's brain, lung, kidney, and/or blood vessel). In various aspects, the blurred image 108 can have any suitable dimensionality. For example, in some cases, the blurred image 108 can be a two-dimensional array of pixels. As another example, in some cases, the blurred image 108 can be a three-dimensional array of voxels. In various instances, the blurred image 108 can exhibit any suitable level of blurring and/or derating that corresponds to the point spread function 106.

In various aspects, the machine learning model 110 can be any suitable machine learning model. For example, the machine learning model 110 can be a deep learning model that exhibits any suitable artificial neural network architecture. In such case, the machine learning model 110 can comprise any suitable number of layers, can have any suitable numbers of neurons in various layers (e.g., different layers can have different numbers of neurons), can have any suitable activation functions (e.g., softmax, sigmoid, hyperbolic tangent, rectified linear units), and/or can have any suitable interneuron connectivity patterns (e.g., forward connections, skip connections, recurrent connections). In various aspects, the machine learning model 110 can lack pooling layers. In various cases, the machine learning model 110 can exhibit any other suitable machine learning architecture as desired (e.g., support vector machine, regression model).

In various aspects, it can be desired to train the machine learning model 110 to deblur the blurred image 108. That is, it can be desired to configure the machine learning model 110 to receive as input the blurred image 108 and to produce as output a deblurred, less-blurred, and/or higher resolution version of the blurred image 108. In various cases, the self-supervised deblurring system 102 can facilitate such training, as described herein.

In various embodiments, the self-supervised deblurring system 102 can comprise a processor 112 (e.g., computer processing unit, microprocessor) and a computer-readable memory 114 that is operably and/or operatively and/or communicatively connected/coupled to the processor 112. The computer-readable memory 114 can store computer-executable instructions which, upon execution by the processor 112, can cause the processor 112 and/or other components of the self-supervised deblurring system 102 (e.g., receiver component 116, training component 118, execution component 120) to perform one or more acts. In various embodiments, the computer-readable memory 114 can store computer-executable components (e.g., receiver component 116, training component 118, execution component 120), and the processor 112 can execute the computer-executable components.

In various embodiments, the self-supervised deblurring system 102 can comprise a receiver component 116. In various aspects, the receiver component 116 can electronically receive and/or otherwise electronically access the blurred image 108. In various instances, the receiver component 116 can electronically retrieve the blurred image 108 from the imaging device 104, via any suitable wired and/or wireless electronic connection. In various other instances, the receiver component 116 can electronically retrieve the blurred image 108 from any suitable data structure (not shown) that is electronically accessible to the receiver component 116 (e.g., a graph data structure, a relational data structure, a hybrid data structure), whether such data structure is remote from and/or local to the receiver component 116. In any case, the receiver component 116 can electronically access the blurred image 108, so that other components of the self-supervised deblurring system 102 can read, manipulate, and/or otherwise interact with the blurred image 108 (e.g., with a copy of the blurred image 108).

In various embodiments, the self-supervised deblurring system 102 can comprise a training component 118. In various aspects, the training component 118 can electronically train, in a self-supervised manner based on the point spread function 106, the machine learning model 110 to deblur the blurred image 108. More specifically, the training component 118 can append a non-trainable convolution layer to a backend of the machine learning model 110. In various instances, the non-trainable convolution layer can be configured to apply a blur kernel (e.g., a blur filter) to the output of the machine learning model 110. In various cases, the blur kernel can be a two-dimensional matrix (and/or a three-dimensional tensor, in some cases) whose dimensions and/or elements are based on the point spread function 106.

As a non-limiting example, the dimensions and/or elements of the blur kernel can be set such that the blur kernel mimics and/or otherwise approximates the point spread function 106. In such case, convolving an inputted image with the blur kernel can cause the inputted image to be blurred in the same way and/or by the same amount as would be caused by the point spread function 106. As another non-limiting example, the dimensions and/or elements of the blur kernel can be set such that the blur kernel mimics and/or otherwise approximates a residual difference between the point spread function 106 and a target point spread function that is sharper than the point spread function 106. In such case, convolving an inputted image with the blur kernel can cause the inputted image to be blurred in the same way and/or by the same amount as would be caused by the residual difference between the point spread function 106 and the target point spread function. In any case, the blur kernel of the non-trainable convolution layer can be based on the point spread function 106.

In various instances, the training component 118 can leverage the non-trainable convolution layer to train the machine learning model 110. More specifically, in various cases, the training component 118 can feed the blurred image 108 to the machine learning model 110. In various cases, the machine learning model 110 can be configured to output a deblurred image based on the blurred image 108. In various aspects, the deblurred image can be considered as an estimated higher resolution version of the blurred image 108 (e.g., a version of the blurred image 108 that has less and/or no blurring).

In various instances, it can be the case that the blurred image 108 is not annotated with a deblurred ground truth. In other words, the blurred image 108 can be the blurred and/or low-resolution version of some deblurred and/or less-blurred ground truth image that is not known and/or otherwise not available. Because the deblurred and/or less-blurred ground truth image is not known and/or not available, existing techniques cannot measure the error and/or loss associated with the deblurred image outputted by the machine learning model 110, which means that existing techniques cannot perform backpropagation on the machine learning model 110. However, the non-trainable convolution layer of the training component 118 can address this problem.

Specifically, the non-trainable convolution layer can receive as input the deblurred image that is outputted by the machine learning model 110. In various aspects, the non-trainable convolution layer can convolve the deblurred image with the blur kernel, thereby yielding a pseudo-blurred image as a result. Just as the blurred image 108 can be considered as being a blurred and/or low-resolution version of the deblurred and/or less-blurred ground truth image, the pseudo-blurred image can be considered as being a re-blurred and/or low-resolution version of the deblurred image outputted by the machine learning model 110. Moreover, the blurred image 108 and the pseudo-blurred image can exhibit the same type and/or amount of blurring, since the blurring in both can have been caused by the point spread function 106 (e.g., the blurred image 108 can be generated by the imaging device 104, which operates according to the point spread function 106; and the pseudo-blurred image can be generated by the non-trainable convolution layer, whose blur kernel is based on the point spread function 106). Thus, the goal can be to make the deblurred image outputted by the machine learning model 110 as close as possible (e.g., within any suitable threshold margin) to the deblurred and/or less-blurred ground truth image, and such goal can be achieved by ensuring that the blurred image 108 is as close as possible (e.g., within any suitable threshold margin) to the pseudo-blurred image outputted by the non-trainable convolution layer.

Accordingly, the training component 118 can update, such as via backpropagation, the internal parameters of the machine learning model 110, based on an error/loss between the blurred image 108 and the pseudo-blurred image outputted by the non-trainable convolution layer. Note that, during such backpropagation, the blur kernel of the non-trainable convolution layer can remain unchanged (hence the term "non-trainable").

In various cases, the training component 118 can perform this procedure for any suitable number of blurred images generated by the imaging device 104, which can be organized into any suitable number and/or sizes of batches and/or epochs. Once any suitable training convergence criterion is met, the internal parameters of the machine learning model 110 can have been optimized so as to accurately deblur images generated by the imaging device 104.

In various instances, the training component 118 can alternatively function as follows. In various cases, the training component 118 can append the non-trainable convolution layer to a backend of the machine learning model 110, as mentioned above. Moreover, in various aspects, the training component 118 can further append a duplicate of the machine learning model 110 to a backend of the non-trainable convolution layer. Accordingly, the machine learning model 110, the non-trainable convolution layer, and the duplicate of the machine learning model 110 can be considered as being coupled in series with each other.

In various aspects, the training component 118 can leverage both the non-trainable convolution layer and the duplicate of the machine learning model 110 to train the machine learning model 110. More specifically, in various cases, the training component 118 can feed the blurred image 108 to the machine learning model 110, which can cause the machine learning model 110 to output a deblurred image based on the blurred image 108.

Just as above, it can be the case that the blurred image 108 is not annotated with a deblurred and/or less-blurred ground truth image. Thus, existing techniques cannot measure the error and/or loss associated with the deblurred image outputted by the machine learning model 110, which means that existing techniques cannot perform backpropagation on the machine learning model 110. However, the non-trainable convolution layer and the duplicate of the machine learning model 110 can address this problem.

Specifically, the non-trainable convolution layer can receive as input the deblurred image that is outputted by the machine learning model 110. In various aspects, as mentioned above, the non-trainable convolution layer can convolve the deblurred image with the blur kernel, thereby yielding a pseudo-blurred image as a result. Moreover, in various instances, the duplicate of the machine learning model 110 can receive as input the pseudo-blurred image, and can produce as output a second deblurred image based on the pseudo-blurred image. As mentioned above, the goal can be to make the deblurred image outputted by the machine learning model 110 as close as possible (e.g., within any suitable threshold margin) to the deblurred and/or less-blurred ground truth image, and such goal can be achieved by ensuring that the blurred image 108 is as close as possible (e.g., within any suitable threshold margin) to the pseudo-blurred image outputted by the non-trainable convolution layer. Furthermore, this goal can be expedited by making the deblurred image outputted by the machine learning model 110 as close as possible (e.g., within any suitable threshold margin) to the second deblurred image outputted by the duplicate of the machine learning model 110.

Accordingly, the training component 118 can update, such as via backpropagation, the internal parameters of the machine learning model 110, based on first error/loss between the blurred image 108 and the pseudo-blurred image outputted by the non-trainable convolution layer, and based on a second error/loss between the deblurred image outputted by the machine learning model 110 and the second deblurred image outputted by the duplicate of the machine learning model 110. By utilizing both the first and second errors/losses, training of the machine learning model 110 can be quickened and/or further stabilized, in various cases. Again, during such backpropagation, the blur kernel of the non-trainable convolution layer can remain unchanged. Moreover, the newly updated internal parameters of the machine learning model 110 can be copied into the duplicate of the machine learning model 110.

In various cases, the training component 118 can perform this procedure for any suitable number of blurred images generated by the imaging device 104, which can be organized into any suitable number and/or sizes of batches and/or epochs. Once any suitable training convergence criterion is met, the internal parameters of the machine learning model 110 can have been optimized so as to accurately deblur images generated by the imaging device 104.

In various embodiments, the self-supervised deblurring system 102 can comprise an execution component 120. In various aspects, the execution component 120 can electronically execute and/or deploy the machine learning model 110 in any suitable operating environment, once the machine learning model 110 has been trained by the training component 118. For example, the execution component 120 can feed to the machine learning model 110 any suitable inputted image generated by the imaging device 104, and the machine learning model 110 can produce as output, without iterating, an accurately deblurred, less-blurred, and/or higher resolution version of the inputted image.

Figure 2:
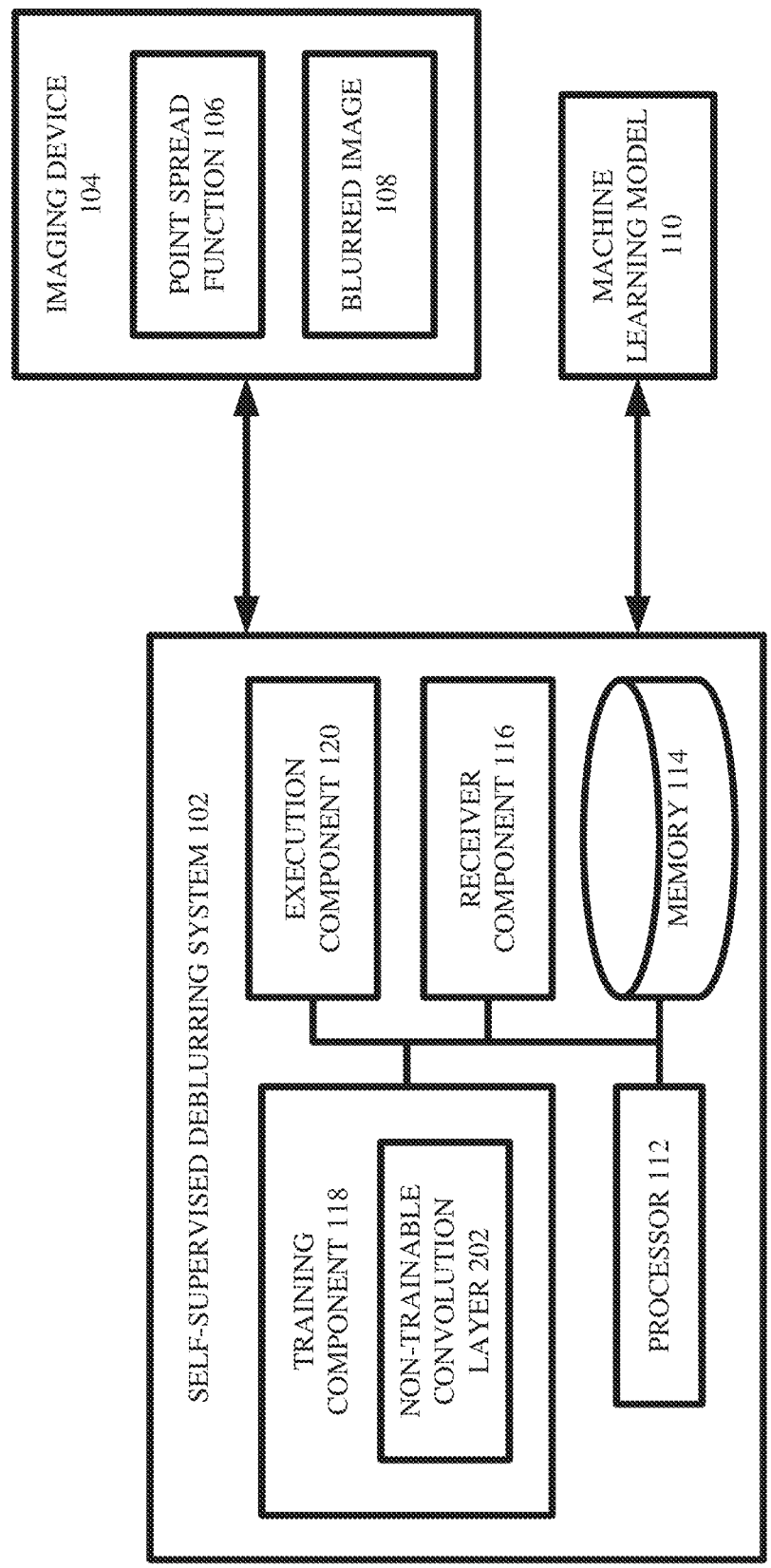
FIG. 2 illustrates a block diagram of an example, non-limiting system including a non-trainable convolution layer that facilitates self-supervised deblurring in accordance with one or more embodiments described herein.

FIG. 2 illustrates a block diagram of an example, non-limiting system 200 including a non-trainable convolution layer that can facilitate self-supervised deblurring in accordance with one or more embodiments described herein. As shown, the system 200 can, in some cases, comprise the same components as the system 100, and can further comprise a non-trainable convolution layer 202.

In various embodiments, the training component 118 can electronically append the non-trainable convolution layer 202 to the machine learning model 110. That is, the non-trainable convolution layer 202 can be configured to receive as input the output (e.g., a deblurred image) produced by the machine learning model 110. In other words, the non-trainable convolution layer 202 can be considered as being coupled in series with the machine learning model 110.

Although the figures illustrate the non-trainable convolution layer 202 as being a single convolution layer, this is a mere non-limiting example. In various cases, any suitable number of non-trainable convolution layers can be implemented in place of the non-trainable convolution layer 202.

In various instances, the non-trainable convolution layer 202 can be any suitable convolution layer that applies a blur kernel to an image received by the non-trainable convolution layer 202. That is, the non-trainable convolution layer 202 can convolve the image received by the non-trainable convolution layer 202 with the blur kernel. In various cases, the blur kernel can be a two-dimensional matrix (and/or a three-dimensional tensor, in some cases) having any suitable dimensionality (e.g., 3×3 kernel, 5×5 kernel, non-square kernel) and/or any suitable numerical elements, which dimensionality and/or numerical elements can be based on the point spread function 106. In other words, the dimensions and/or numerical elements of the blur kernel can be controllably set and/or configured such that convolving an image with the blur kernel causes the image to experience a blur in accordance with the point spread function 106. In some cases, the dimensionality and/or numerical elements of the blur kernel can be controllably set and/or configured such that convolution via the blur kernel causes a blur that mimics that caused by the point spread function 106. In other cases, the dimensionality and/or numerical elements of the blur kernel can be controllably set and/or configured such that convolution via the blur kernel causes a blur that mimics that caused by a residual point spread differential between the point spread function 106 and a sharper target point spread function. Such embodiments are further discussed with respect to FIGS. 3-4.

Figure 3:
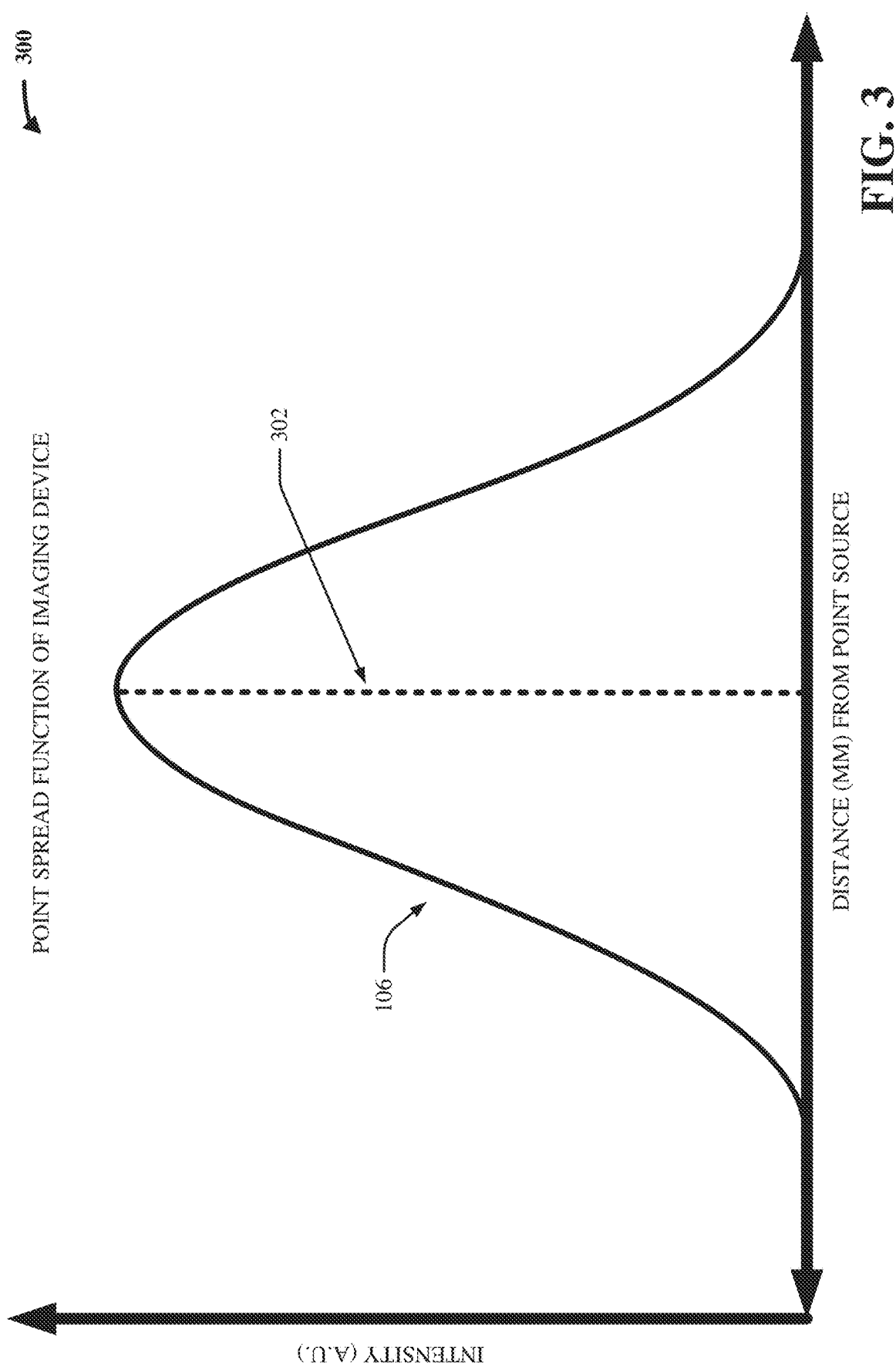
FIGS. 3-4 illustrate example, non-limiting diagrams of point spread functions in accordance with one or more embodiments described herein.
Figure 4:
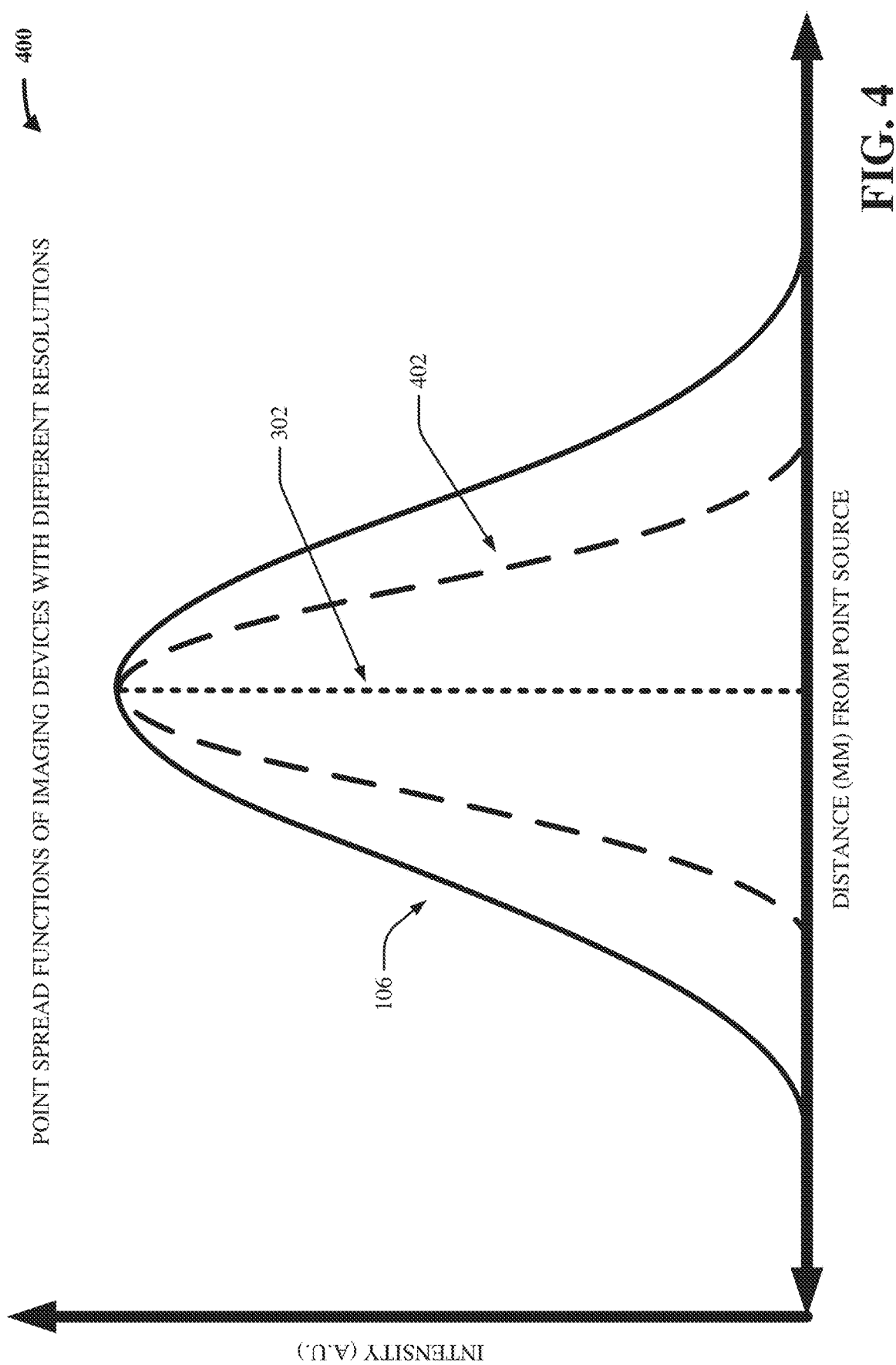

FIGS. 3-4 illustrate example, non-limiting diagrams 300-400 of point spread functions in accordance with one or more embodiments described herein.

Consider FIG. 3. As shown, FIG. 3 illustrates a non-limiting example embodiment of the point spread function 106. As mentioned above, the point spread function 106 can quantify and/or otherwise indicate how the imaging device 104 blurs a point source of light. Accordingly, the point spread function 106 can be conveyed and/or visualized as a graph comparing intensity of captured light to physical lateral distance (e.g., along any suitable direction) from the point source of light. Here, the diagram 300 includes an abscissa (e.g., x-axis) that denotes the physical lateral distance (e.g., measured in millimeters) from a point source 302 and an ordinate (e.g., y-axis) that denotes the intensity (e.g., measured in arbitrary units) of light captured from the point source 302. As can be seen, the point spread function 106 reaches its maximum at the location of the point source 302, and the point spread function 106 approaches its minimum as the absolute value of physical lateral distance from the point source 302 increases (e.g., as distance on either side of the point source 302 increases). In various cases, the wider the point spread function 106 is as measured by full-width-half-maximum (FWHM), the more blur is associated with and/or otherwise caused by the point spread function 106. Conversely, the narrower the point spread function 106 is as measured by FWHM, the less blur is associated with and/or otherwise caused by the point spread function 106.

In various cases, those having ordinary skill in the art will appreciate that the point spread function 106 of the imaging device 104 can be experimentally estimated and/or determined. For example, a gold-foil phantom experiment can be conducted using the imaging device 104, so as to determine the point spread function 106. For instance, the gold foil phantom can contain a small piece of gold foil (e.g., having a diameter of 1 millimeter, having a thickness of 0.025 millimeters) that is embedded in any suitable plastic and which can be expected to provide a well-simulated δ-impulse. Scanning of the gold foil phantom with the imaging device 104 can thus yield the point spread function 106.

In various aspects, once the point spread function 106 is known and/or experimentally estimated, the blur kernel of the non-trainable convolution layer 202 can be controllably configured based on the point spread function 106.

Specifically, in various embodiments, the blur kernel can be controllably configured, such that convolution via the blur kernel causes a blur that mimics and/or is otherwise similar to that caused by the point spread function 106. In other words, the dimensions and/or numerical elements of the blur kernel can be controllably adjusted to any suitable magnitudes, such that convolving an unblurred and/or high-resolution image of the point source 302 by the blur kernel yields a blurred image whose blur is given by the point spread function 106. In still other words, the dimensions and/or numerical elements of the blur kernel can be controllably modulated such that convolution via the blur kernel can be considered as a mathematical transformation that converts the point source 302 to the point spread function 106. Those having ordinary skill in the art will appreciate how the dimensions and/or numerical elements of the blur kernel can be controlled to achieve such result.

In various other embodiments, the blur kernel can be controllably configured, such that convolution via the blur kernel causes a blur that mimics and/or is otherwise similar to that caused by the residual difference between the point spread function 106 and a sharper target point spread function. This is discussed with respect to FIG. 4.

As shown, FIG. 4 illustrates the non-limiting example embodiment of the point spread function 106, as well as a non-limiting example embodiment of a target point spread function 402. As mentioned above, the point spread function 106 can quantify and/or otherwise indicate how the imaging device 104 blurs a point source of light. Similarly, the target point spread function 402 can quantify and/or otherwise indicate how another imaging device (not shown) blurs a point source of light. In other cases, the target point spread function 402 can be any suitable point spread function that is different from the point spread function 106, regardless of whether the target point spread function 104 corresponds to an actual imaging device (e.g., it can be the case that the target point spread function 402 does not correspond to an actual imaging device and is instead an artificial point spread function that is manually defined by an operator). Just like the point spread function 106, the target point spread function 402 reaches its maximum at the location of the point source 302, and the target point spread function 402 approaches its minimum as the absolute value of physical lateral distance from the point source 302 increases. Note that, in the non-limiting example shown, the target point spread function 402 is narrower and/or sharper than the point spread function 106. In other words, the target point spread function 402 can have a smaller FWHM as compared to the point spread function 106. Accordingly, this can mean that the target point spread function 402 represents and/or causes less blur than the point spread function 106.

As those having ordinary skill in the art will appreciate, FWHM is a mere non-limiting example of a technique by which a shape difference between the point spread function 106 and the target point spread function 402 can be measured and/or quantified. In various instances, the shape difference between the point spread function 106 and the target point spread function 402 can be quantified via any other suitable technique. For example, the shape difference can be quantified as a difference between the kurtosis of the point spread function 106 and the kurtosis of the target point spread function 402. As another example, the shape difference can be quantified as a difference between the monotonicity of the point spread function 106 and the monotonicity of the target point spread function 402. As yet another example, the shape difference can be quantified as a difference between the Fourier/wavelet descriptors of the point spread function 106 and the Fourier/wavelet descriptors of the target point spread function 402.

If the target point spread function 402 corresponds to an actual imaging device, the target point spread function 402 can be experimentally estimated, such as by conducting a gold foil phantom experiment with that actual imaging device. In various other cases, if the target point spread function 402 does not correspond to an actual imaging device, the target point spread function 402 can be manually defined by an operator as desired.

In various aspects, the blur kernel of the non-trainable convolution layer 202 can be controllably configured based on both the point spread function 106 and the target point spread function 402.

Specifically, in various embodiments, the blur kernel can be controllably configured, such that convolution via the blur kernel causes a blur that mimics and/or is otherwise similar to that caused by a residual difference between the point spread function 106 and the target point spread function 402. In other words, the dimensions and/or numerical elements of the blur kernel can be controllably adjusted to any suitable magnitudes, such that convolving an image, which exhibits a blur defined by the target point spread function 402, by the blur kernel yields a blurred image whose blur is given by the point spread function 106. In still other words, the dimensions and/or numerical elements of the blur kernel can be controllably modulated such that convolution via the blur kernel can be considered as a mathematical transformation that converts the target point spread function 402 to the point spread function 106. That is, the blur kernel can be configured so that convolution via the blur kernel can cause a residual blur that is defined by the difference between the point spread function 106 and the target point spread function 402. Those having ordinary skill in the art will appreciate how the dimensions and/or numerical elements of the blur kernel can be controlled to achieve such result.

Accordingly, as explained with respect to FIG. 3, one or more embodiments of the subject innovation can involve configuring the blur kernel of the non-trainable convolution layer 202, such that the blur kernel causes, mimics, and/or approximates a blur that is defined by the point spread function 106. Moreover, as explained with respect to FIG. 4, one or more other embodiments of the subject innovation can involve configuring the blur kernel of the non-trainable convolution layer 202, such that the blur kernel causes, mimics, and/or approximates a residual blur that is defined by the difference between the point spread function 106 and the target point spread function 402. In various cases, the former approach can be taken when it is desired to train the machine learning model 110 to remove all blurring in images generated by the imaging device 104 (e.g., when the desired ground truth is an ideal image that does not include any blurring associated with the point spread function 106). In various other cases, the latter approach can be taken when it is desired to train the machine learning model 110 to remove only some of the blurring in images generated by the imaging device 104 (e.g., to remove only the residual blurring that is defined by the difference between the point spread function 106 and the target point spread function 402, in cases where the desired ground truth is a less-blurred image given by the target point spread function 402).

In any case, the blur kernel of the non-trainable convolution layer 202 can be based in any suitable fashion on the point spread function 106.

Figure 5:
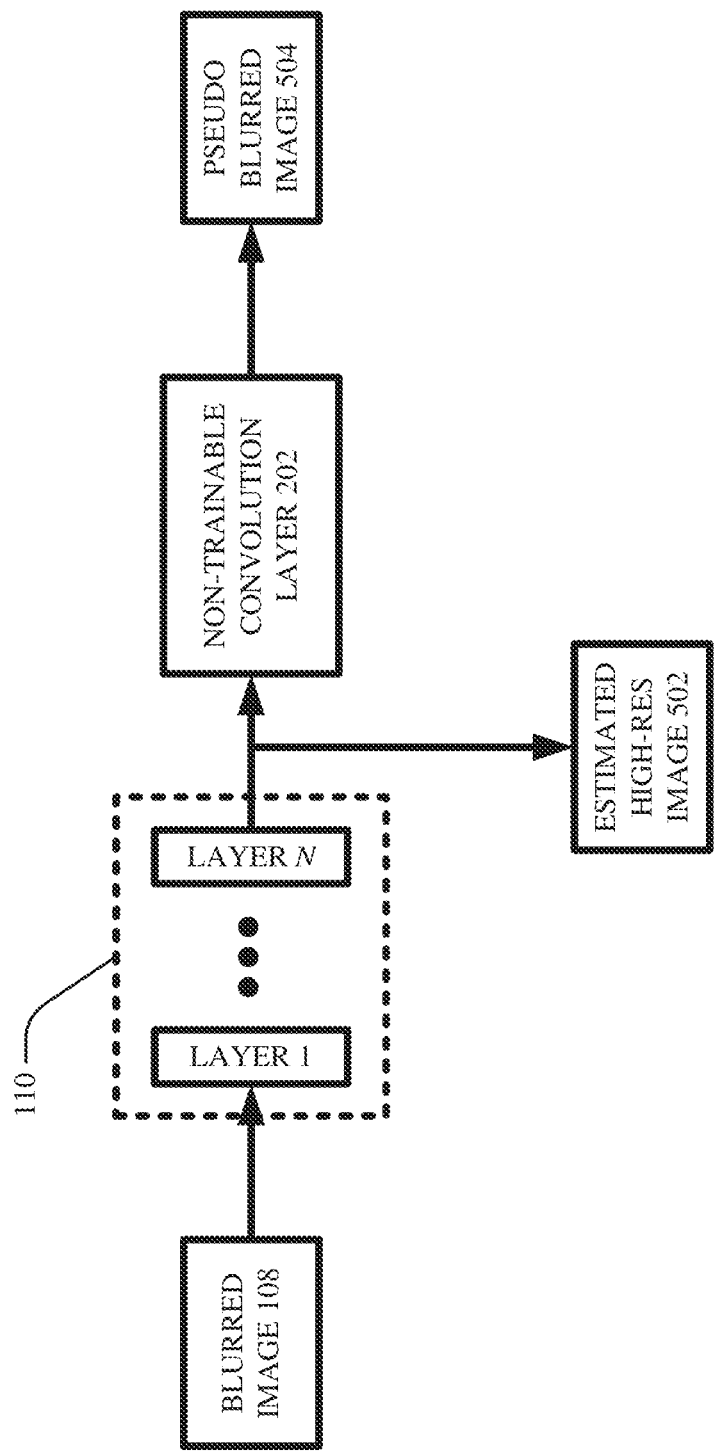
FIG. 5 illustrates an example, non-limiting block diagram showing how a non-trainable convolution layer can be implemented for self-supervised deblurring in accordance with one or more embodiments described herein.

FIG. 5 illustrates an example, non-limiting block diagram 500 showing how a non-trainable convolution layer can be implemented for self-supervised deblurring in accordance with one or more embodiments described herein. In other words, FIG. 5 depicts how the training component 118 can leverage the non-trainable convolution layer 202 to train the machine learning model 110 in a self-supervised fashion.

In various embodiments, as shown, the machine learning model 110 can be coupled in series with the non-trainable convolution layer 202. In various aspects, the machine learning model 110 can exhibit a deep learning architecture. For example, the machine learning model 110 can comprise n layers, for any suitable positive integer n (e.g., layer 1 to layer n). In various instances, the training component 118 can feed the blurred image 108 to the machine learning model 110. This can cause the machine learning model 110 to generate an estimated high-res image 502 based on the blurred image 108. More specifically, the training component 118 can feed the blurred image 108 to the layer 1 of the machine learning model 110. Accordingly, the layer 1 can generate one or more activations based on the blurred image 108, and such one or more activations can be received by a layer 2 (not shown). Likewise, the layer 2 can generate one or more of its own activations based on the one or more activations from the layer 1, which can then be received by a layer 3 (not shown). Eventually, the layer n can receive one or more activations from a layer n-1 (not shown), and the layer n can generate the estimated high-res image 502 based on the one or more activations from the layer n-1.

In various cases, the estimated high-res image 502 can be considered as the deblurred and/or less-blurred version of blurred image 108 that is inferred by the machine learning model 110. However, when the machine learning model 110 has undergone no and/or little training, the estimated high-res image 502 can be inaccurate.

In various aspects, as shown, the non-trainable convolution layer 202 can receive the estimated high-res image 502. In various instances, the non-trainable convolution layer 202 can convolve the estimated high-res image 502 with the blur kernel, which can result in the pseudo-blurred image 504. In various cases, the pseudo-blurred image 504 can be considered as a re-blurred version of the estimated high-res image 502. That is, the pseudo-blurred image 504 can be considered as being analogous to and/or a counterpart of the blurred image 108.

Note that both the blurred image 108 and the pseudo-blurred image 504 can be generated based on the point spread function 106. Specifically, the blurred image 108 can be captured and/or generated by the imaging device 104, which operates according to the point spread function 106, and the pseudo-blurred image 504 can be generated by the blur kernel of the non-trainable convolution layer 202, which is itself based on the point spread function 106. Accordingly, it can be the case that the more similar the pseudo-blurred image 504 is to the blurred image 108, the more accurate the estimated high-res image 502 is (e.g., the more similar the estimated high-res image 502 is to some unknown deblurred and/or less-blurred ground truth image corresponding to the blurred image 108). Conversely, it can be the case that the less similar the pseudo-blurred image 504 is to the blurred image 108, the less accurate the estimated high-res image 502 is (e.g., the less similar the estimated high-res image 502 is to the unknown deblurred and/or less-blurred ground truth image corresponding to the blurred image 108). Accordingly, the training component 118 can compute an error/loss between the pseudo-blurred image 504 and the blurred image 108. In cases where the non-trainable convolution layer 202 is based on both the point spread function 106 and the target point spread function 402, such error/loss can be additively offset by a term that is based on a kurtosis difference, a monotonicity difference, a FWHM difference, a Fourier/wavelet difference, and/or any other suitable measure of shape difference between the point spread function 106 and the target point spread function 402. In any case, the training component 118 can update, via backpropagation, the internal parameters (e.g., weights, biases) of the machine learning model 110 based on such error/loss. Because backpropagation can be facilitated in this way without knowing the deblurred ground truth image corresponding to the blurred image 108, this training can be considered as self-supervised. Moreover, note that the blur kernel of the non-trainable convolution layer 202 can remain unchanged during such backpropagation (e.g., hence the name "non-trainable").

In various aspects, the training component 118 can repeat this training procedure for any suitable number of blurred images generated by the imaging device 104, which can ultimately cause the internal parameters of the machine learning model 110 to be iteratively optimized. Once its internal parameters are optimized, the machine learning model 110 can accurately deblur (e.g., eliminate and/or reduce blur in) images generated by the imaging device 104. Those having ordinary skill in the art will understand that any suitable number and/or sizes of training batches and/or training epochs can be implemented as desired.

Figure 6:
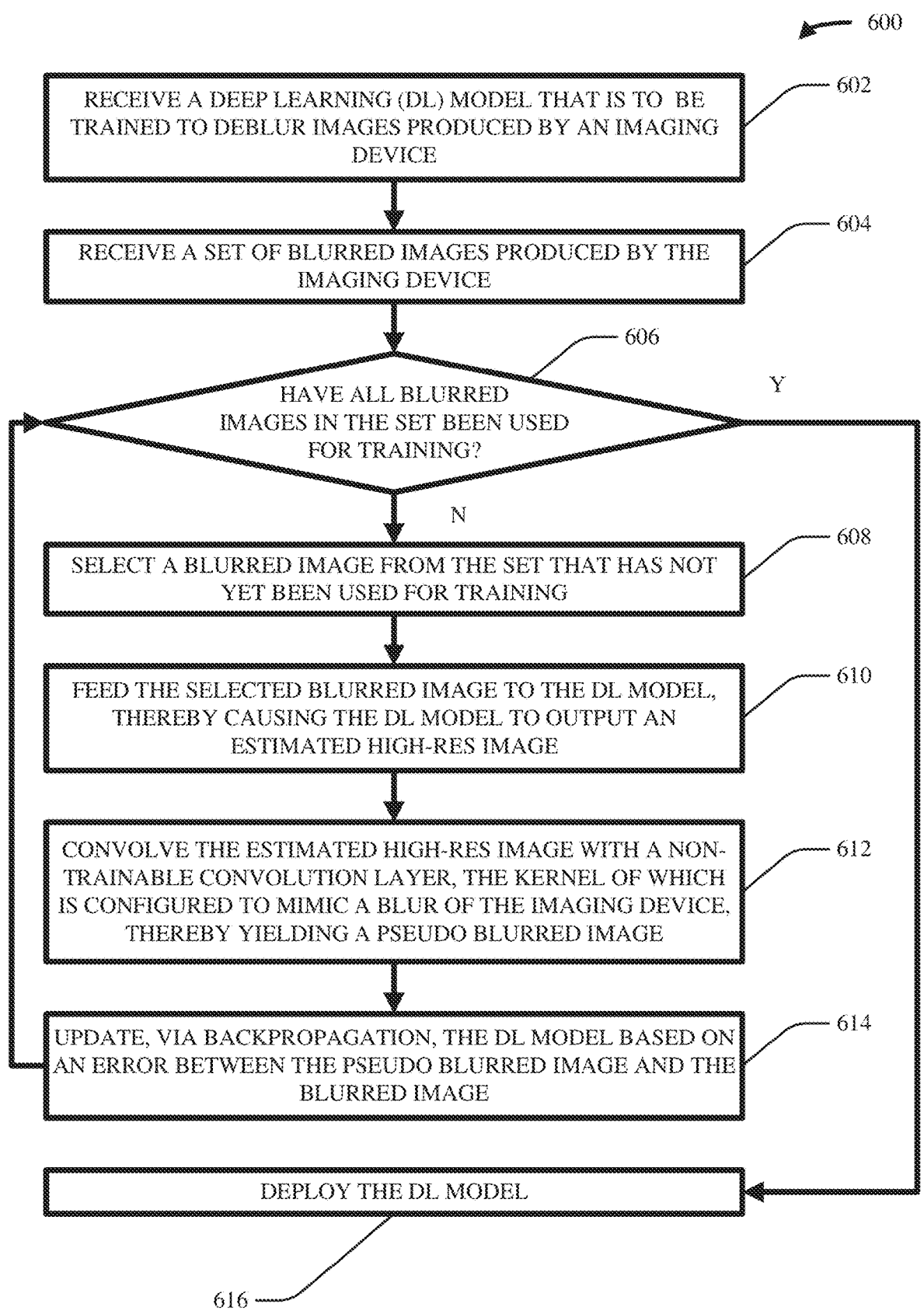
FIG. 6 illustrates a flow diagram of an example, non-limiting computer-implemented method that facilitates self-supervised deblurring in accordance with one or more embodiments described herein.

FIG. 6 illustrates a flow diagram of an example, non-limiting computer-implemented method 600 that can facilitate self-supervised deblurring in accordance with one or more embodiments described herein. In various cases, the computer-implemented method 600 can be facilitated by the self-supervised deblurring system 102.

In various embodiments, act 602 can include receiving, by a device (e.g., 116) operatively coupled to a processor, a deep learning (DL) model (e.g., 110) that is to be trained to deblur (e.g., eliminate and/or reduce blur in) images produced by an imaging device (e.g., 104).

In various aspects, act 604 can include receiving, by the device (e.g., 116), a set of blurred images produced by the imaging device.

In various instances, act 606 can include determining, by the device (e.g., 118), whether all blurred images in the set of blurred images have been used to train the DL model. If yes, the computer-implemented method 600 can proceed to act 616. If not, the computer-implemented method 600 can proceed to act 608.

In various cases, act 608 can include selecting, by the device (e.g., 118), a blurred image (e.g., 108) that has not yet been used for training from the set of blurred images.

In various aspects, act 610 can include feeding, by the device (e.g., 118), the selected blurred image to the DL model, thereby causing the DL model to output an estimated high-res image (e.g., 502).

In various instances, act 612 can include convolving, by the device (e.g., 118), the estimated high-res image with a non-trainable convolution layer (e.g., 202), the kernel of which is configured to mimic, model, and/or approximate a blur of the imaging device. This can yield a pseudo-blurred image (e.g., 504).

In various cases, act 614 can include updating, by the device (e.g., 118) and via backpropagation, the DL model based on an error between the pseudo blurred image and the blurred image. In various aspects, the computer-implemented method 600 can proceed back to act 606.

In various instances, act 616 can include deploying, by the device (e.g., 120), the DL model.

Figure 7:
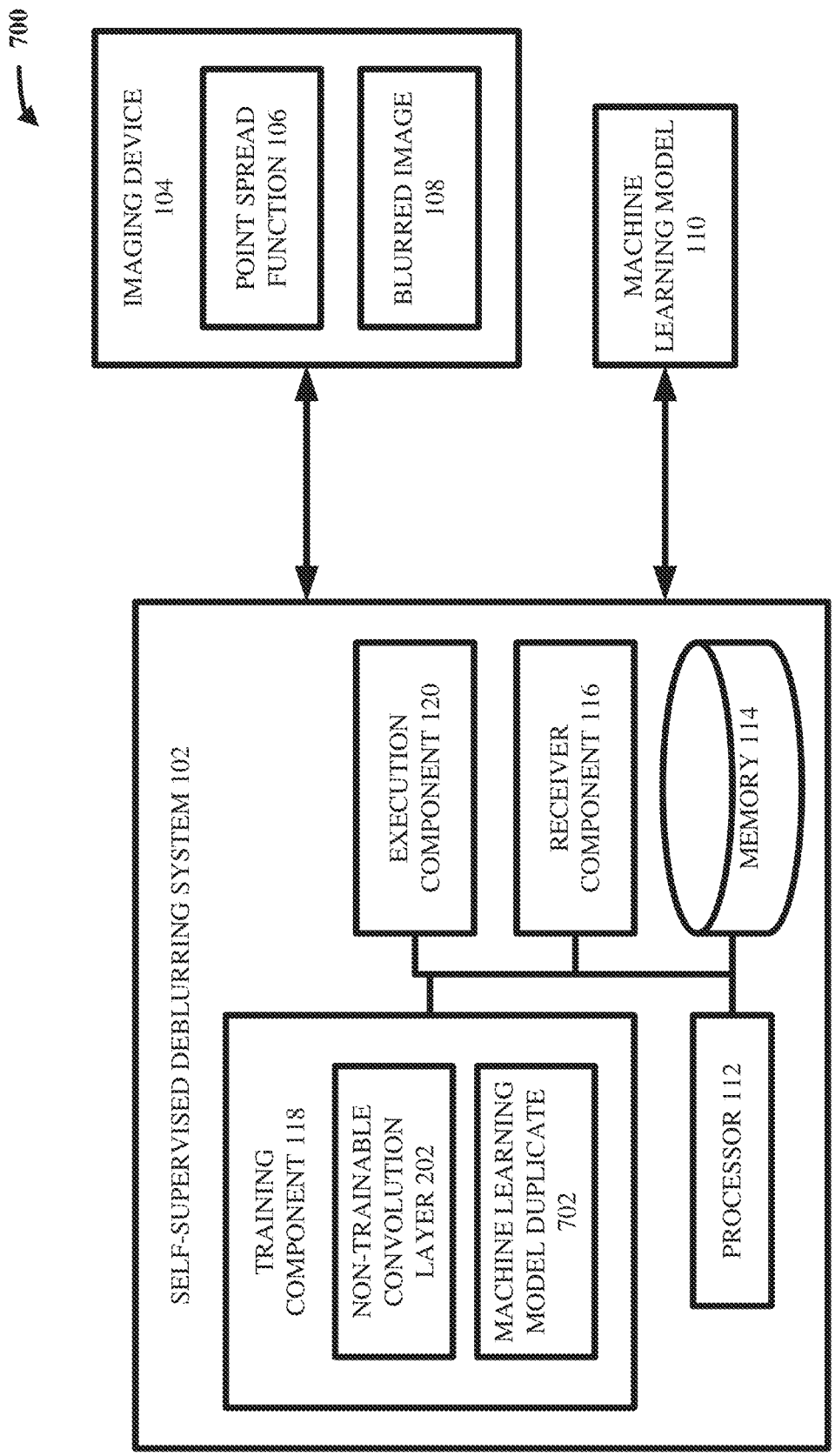
FIG. 7 illustrates a block diagram of an example, non-limiting system including a machine learning model duplicate that facilitates self-supervised deblurring in accordance with one or more embodiments described herein.

FIG. 7 illustrates a block diagram of an example, non-limiting system 700 including a machine learning model duplicate that can facilitate self-supervised deblurring in accordance with one or more embodiments described herein. As show, the system 700 can, in some cases, comprise the same components as the system 200, and can further comprise a machine learning model duplicate 702.

In various embodiments, the machine learning model duplicate 702 can be a copy of the machine learning model 110. Thus, the internal parameters of the machine learning model duplicate 702 can be the same as those of the machine learning model 110 (e.g., full weight sharing). In various aspects, the training component 118 can electronically append the machine learning model duplicate 702 to the non-trainable convolution layer 202. That is, the non-trainable convolution layer 202 can be configured to receive as input the output generated by the machine learning model 110, and the machine learning model duplicate 702 can be configured to receive as input the output of the non-trainable convolution layer 202. In other words, the machine learning model 110, the non-trainable convolution layer 202, and/or the machine learning model duplicate 702 can be coupled in series with each other. In various cases, the training component 118 can leverage the machine learning model duplicate 702 to more effectively train the machine learning model 110. This is discussed more with respect to FIG. 8.

Figure 8:
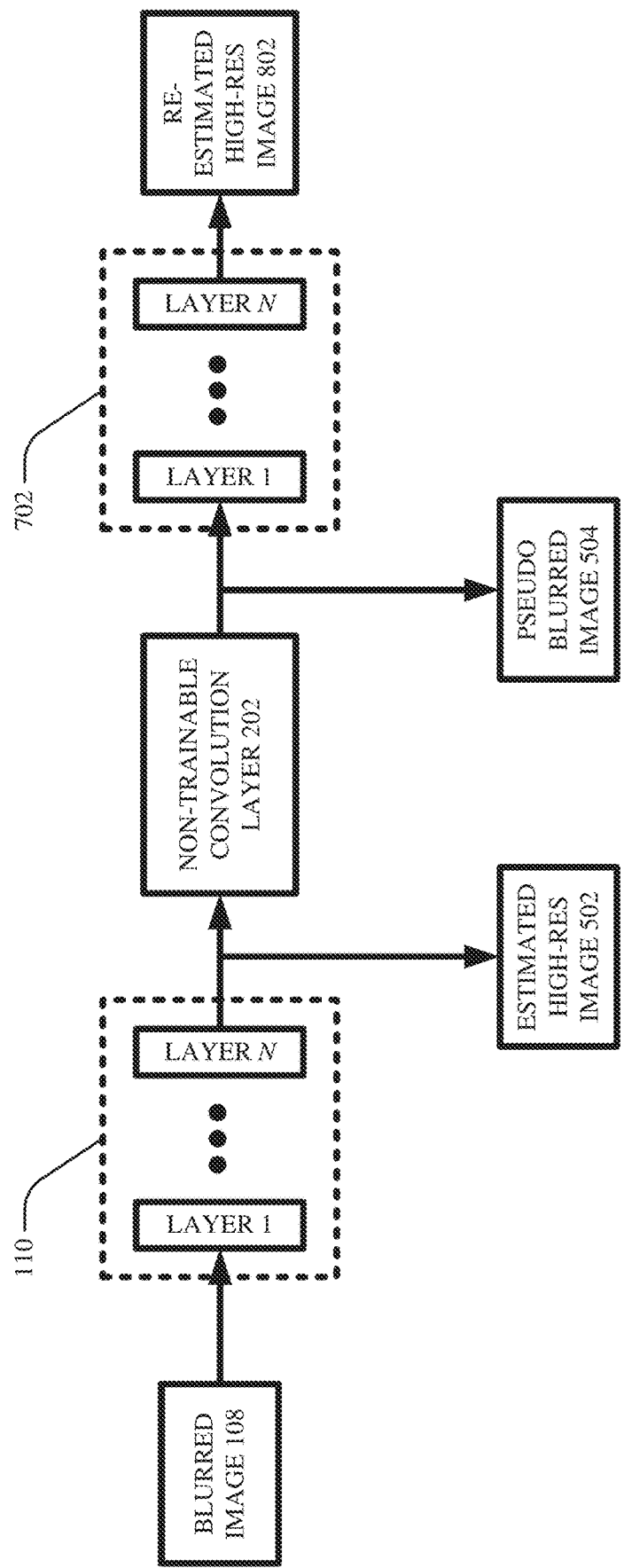
FIG. 8 illustrates an example, non-limiting block diagram showing how a non-trainable convolution layer and a machine learning model duplicate can be implemented for self-supervised deblurring in accordance with one or more embodiments described herein.

FIG. 8 illustrates an example, non-limiting block diagram 800 showing how a non-trainable convolution layer and a machine learning model duplicate can be implemented for self-supervised deblurring in accordance with one or more embodiments described herein. In other words, FIG. 8 depicts how the training component 118 can leverage both the non-trainable convolution layer 202 and the machine learning model duplicate 702 to train the machine learning model 110 in a self-supervised fashion.

In various embodiments, as shown, the machine learning model 110 can be coupled in series with the non-trainable convolution layer 202 and with the machine learning model duplicate 702. In various aspects, as mentioned above, the machine learning model 110 can exhibit a deep learning architecture. Accordingly, the machine learning model duplicate 702 can exhibit the same deep learning architecture (e.g., layer 1 to layer n).

In various instances, the training component 118 can feed the blurred image 108 to the machine learning model 110, which can cause the machine learning model 110 to generate the estimated high-res image 502 based on the blurred image 108, as described above. In various aspects, as shown, the non-trainable convolution layer 202 can receive the estimated high-res image 502, which can cause the non-trainable convolution layer 202 to convolve the estimated high-res image 502 with the blur kernel. As explained above, this can result in the pseudo-blurred image 504. Moreover, as shown, the machine learning model duplicate 702 can receive the pseudo-blurred image 504 and can generate a re-estimated high-res image 802 based on the pseudo-blurred image 504.

In various cases, the re-estimated high-res image 802 can be considered as a deblurred version of the pseudo-blurred image 504. That is, the pseudo-blurred image 504 and the re-estimated high-res image 802 can be respectively analogous to and/or can be considered as respective counterparts of the blurred image 108 and the estimated high-res image 502.

As explained above, it can be the case that the more similar the pseudo-blurred image 504 is to the blurred image 108, the more accurate the estimated high-res image 502 is (e.g., the more similar the estimated high-res image 502 is to some unknown deblurred and/or less-blurred ground truth image corresponding to the blurred image 108). Conversely, it can be the case that the less similar the pseudo-blurred image 504 is to the blurred image 108, the less accurate the estimated high-res image 502 is (e.g., the less similar the estimated high-res image 502 is to the unknown deblurred and/or less-blurred ground truth image corresponding to the blurred image 108). In similar fashion, the more similar the re-estimated high-res image 802 is to the estimated high-res image 502, the more accurate the estimated high-res image 502 is. Conversely, the less similar the re-estimated high-res image 802 is to the estimated high-res image 502, the less accurate the estimated high-res image 502 is. Accordingly, the training component 118 can compute a first error/loss between the pseudo-blurred image 504 and the blurred image 108, and can compute a second error/loss between the re-estimated high-res image 802 and the estimated high-res image 502. As mentioned above, if the non-trainable convolution layer 202 is based on both the point spread function 106 and the target point spread function 402, the first error/loss can be additively offset by a term that is based on a kurtosis difference, a monotonicity difference, a FWHM difference, a Fourier/wavelet difference, and/or any other suitable measure of shape difference between the point spread function 106 and the target point spread function 402. In any case, the training component 118 can update, via backpropagation, the internal parameters (e.g., weights, biases) of the machine learning model 110 based on both the first error/loss and the second error/loss. Note that inclusion of the second error/loss can help to further stabilize training of the machine learning model 110. Again, because backpropagation can be facilitated in this way without knowing the deblurred and/or less-blurred ground truth image corresponding to the blurred image 108, this training can be considered as self-supervised. Furthermore, note that the blur kernel of the non-trainable convolution layer 202 can remain unchanged during such backpropagation.

In various aspects, the training component 118 can repeat this training procedure for any suitable number of blurred images generated by the imaging device 104, which can ultimately cause the internal parameters of the machine learning model 110 to be iteratively optimized. Once its internal parameters are optimized, the machine learning model 110 can accurately deblur (e.g., eliminate and/or reduce blur in) images generated by the imaging device 104. Those having ordinary skill in the art will understand that any suitable number and/or sizes of training batches and/or training epochs can be implemented as desired.

Figure 9:
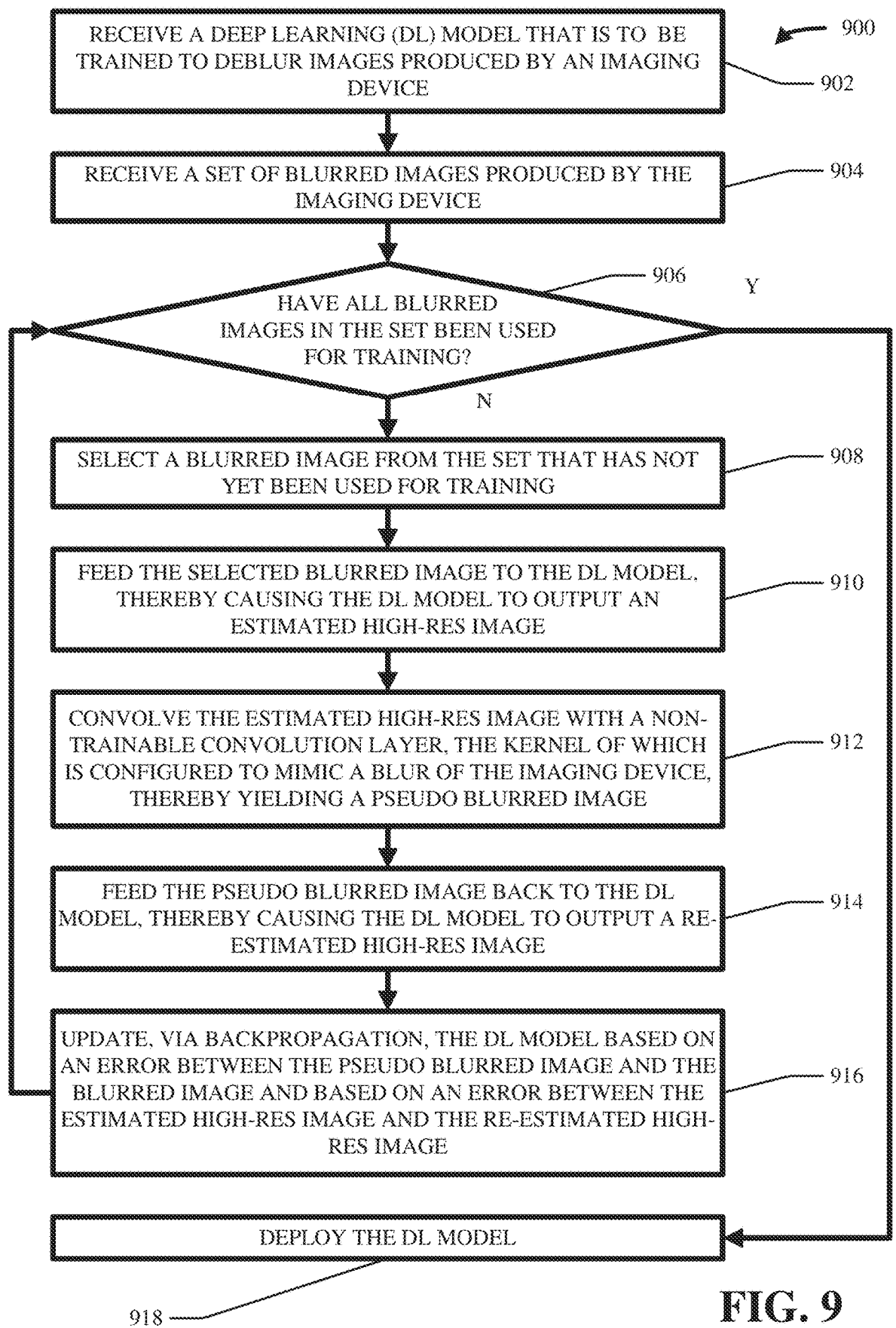
FIG. 9 illustrates a flow diagram of an example, non-limiting computer-implemented method that facilitates self-supervised deblurring in accordance with one or more embodiments described herein.

FIG. 9 illustrates a flow diagram of an example, non-limiting computer-implemented method 900 that can facilitate self-supervised deblurring in accordance with one or more embodiments described herein. In various cases, the computer-implemented method 900 can be facilitated by the self-supervised deblurring system 102.

In various embodiments, act 902 can include receiving, by a device (e.g., 116) operatively coupled to a processor, a deep learning (DL) model (e.g., 110) that is to be trained to deblur (e.g., eliminate and/or reduce blur in) images produced by an imaging device (e.g., 104).

In various aspects, act 904 can include receiving, by the device (e.g., 116), a set of blurred images produced by the imaging device.

In various instances, act 906 can include determining, by the device (e.g., 118), whether all blurred images in the set of blurred images have been used to train the DL model. If yes, the computer-implemented method 900 can proceed to act 918. If not, the computer-implemented method 900 can proceed to act 908.

In various cases, act 908 can include selecting, by the device (e.g., 118), a blurred image (e.g., 108) that has not yet been used for training from the set of blurred images.

In various aspects, act 910 can include feeding, by the device (e.g., 118), the selected blurred image to the DL model, thereby causing the DL model to output an estimated high-res image (e.g., 502).

In various instances, act 912 can include convolving, by the device (e.g., 118), the estimated high-res image with a non-trainable convolution layer (e.g., 202), the kernel of which is configured to mimic, model, and/or otherwise implement a blur of the imaging device. This can yield a pseudo-blurred image (e.g., 504).

In various cases, act 914 can include feeding, by the device (e.g., 118), the pseudo-blurred image back to the DL model, thereby causing the DL model to output a re-estimated high-res image (e.g., 802). Equivalently, act 914 can include feeding, by the device (e.g., 118), the pseudo-blurred image to a duplicate and/or copy of the DL model (e.g., 702), thereby causing the duplicate and/or copy of the DL model to generate the re-estimated high-res image. In any case, the re-estimated high-res image can be obtained.

In various cases, act 916 can include updating, by the device (e.g., 118) and via back propagation, the DL model based on an error between the pseudo blurred image and the blurred image, and based on an error between the estimated high-res image and the re-estimated high-res image. In various aspects, the computer-implemented method 900 can proceed back to act 906.

In various instances, act 918 can include deploying, by the device (e.g., 120), the DL model.

Figure 10:
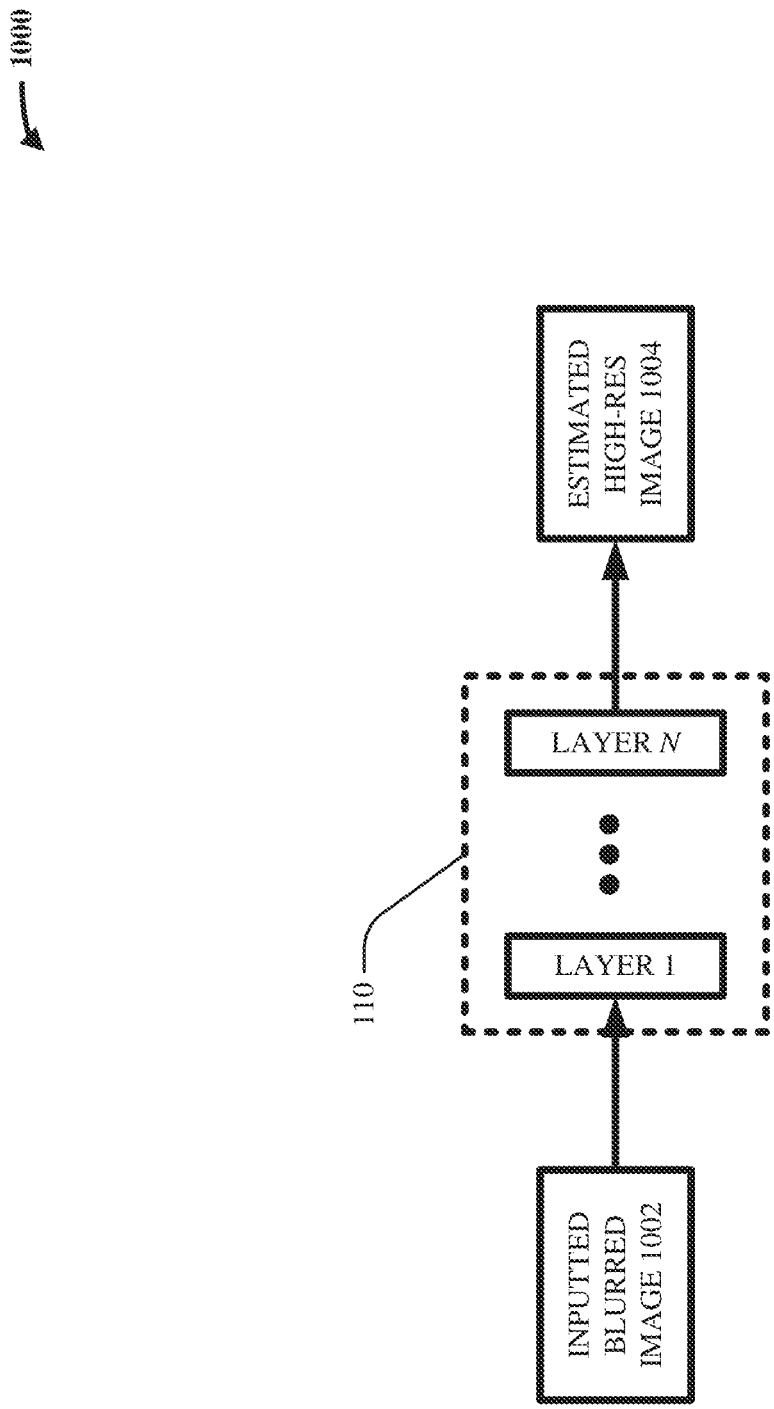
FIG. 10 illustrates an example, non-limiting block diagram showing how a self-supervised deblurring model can be deployed after training in accordance with one or more embodiments described herein.

FIG. 10 illustrates an example, non-limiting block diagram 1000 showing how a self-supervised deblurring model can be deployed after training in accordance with one or more embodiments described herein.

As shown, once the machine learning model 110 is trained by the training component 118, the execution component 120 can, in various cases, electronically feed an inputted blurred image 1002 to the machine learning model 110. In various aspects, the inputted blurred image 1002 can be any suitable image generated by the imaging device 104 and/or by any other imaging device that operates according to the point spread function 106. In various instances, as shown, the machine learning model 110 can generate an estimated high-res image 1004 based on the inputted blurred image 1002. Because the machine learning model 110 can have been trained as described herein, the estimated high-res image 1004 can be an accurate deblurred and/or less-blurred version of the inputted blurred image 1002. Note that, once trained, the machine learning model 110 can generate the estimated high-res image 1004 without iterating.

FIGS. 11-14 illustrate example, non-limiting results 1100-1400 obtained by self-supervised deblurring in accordance with one or more embodiments described herein. In other words, FIGS. 11-14 depict various non-limiting before-and-after examples of images (e.g., CT scans, in particular) that have been deblurred by various embodiments of the subject innovation.

Figure 11:
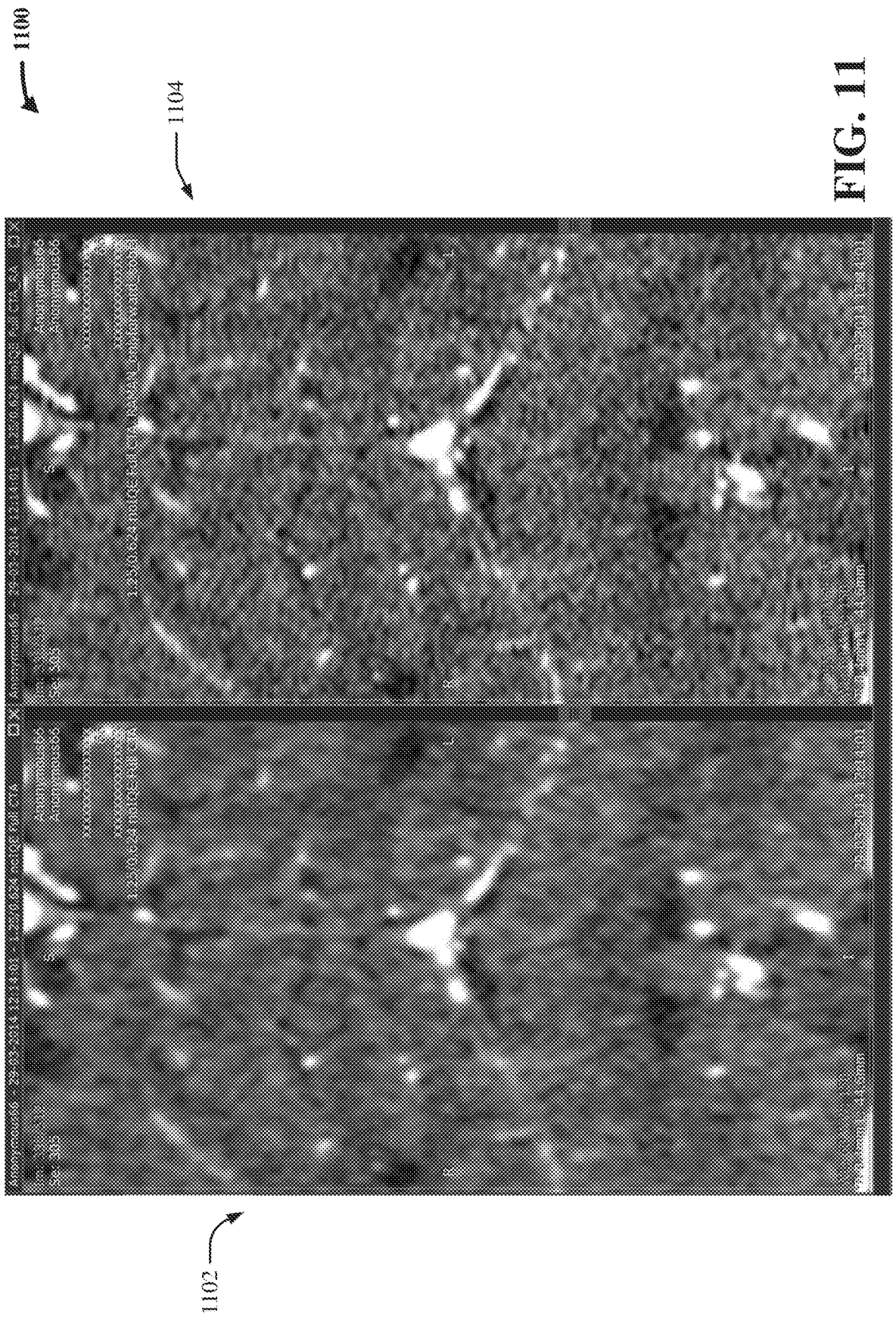
FIGS. 11-14 illustrate example, non-limiting results obtained by self-supervised deblurring in accordance with one or more embodiments described herein.

For example, FIG. 11 shows a blurred image 1102 and a corresponding deblurred and/or less-blurred image 1104 generated by various embodiments of the subject innovation based on the blurred image 1102. As can be seen, the deblurred and/or less-blurred image 1104 is noticeably clearer and/or sharper, such that additional detail and/or smaller structures can be more easily visually perceived.

Figure 12:
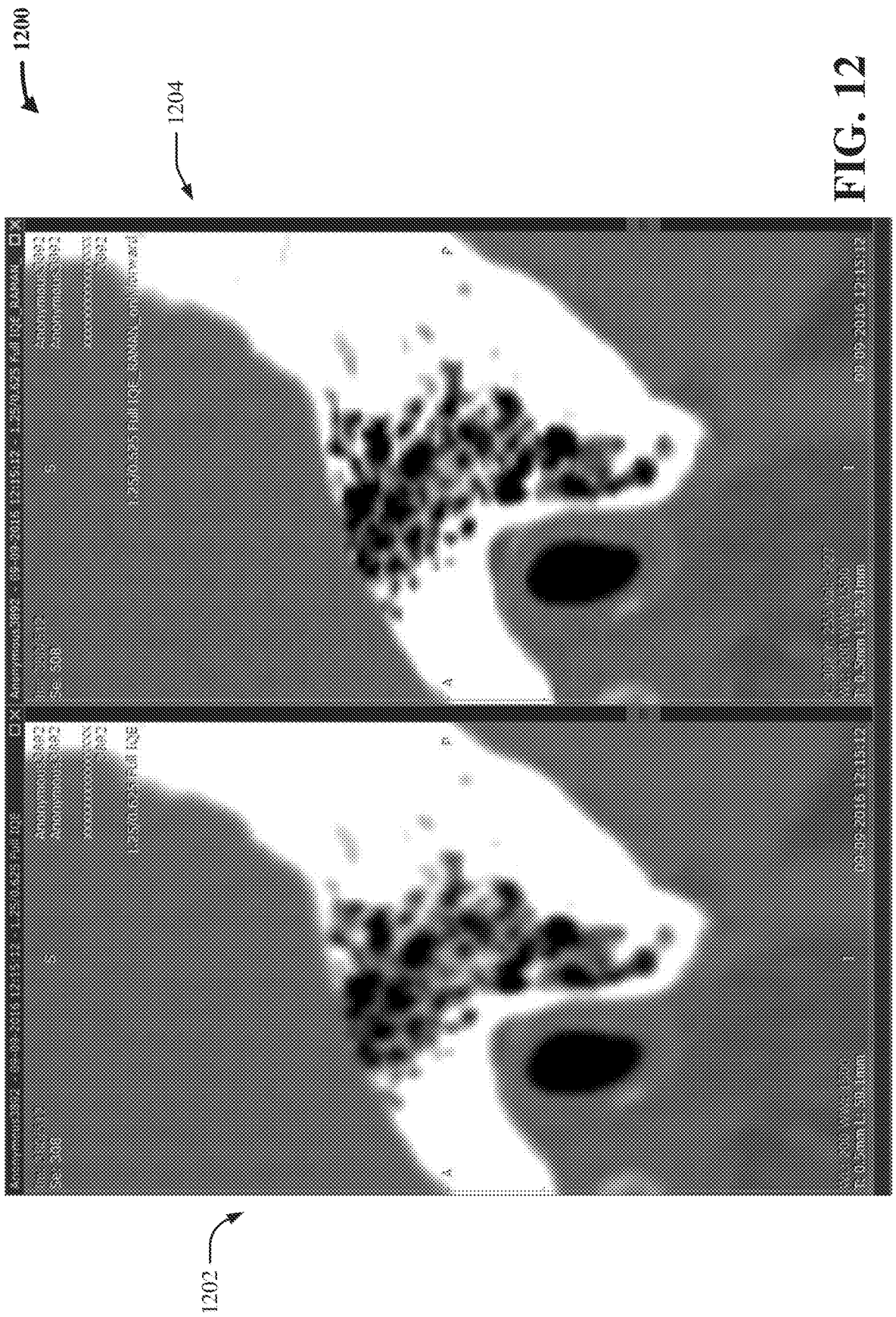

As another example, FIG. 12 shows a blurred image 1202 and a corresponding deblurred and/or less-blurred image 1204 generated by various embodiments of the subject innovation based on the blurred image 1202. Again, the deblurred and/or less-blurred image 1204 is noticeably clearer and/or sharper than the blurred image 1202.

Figure 13:
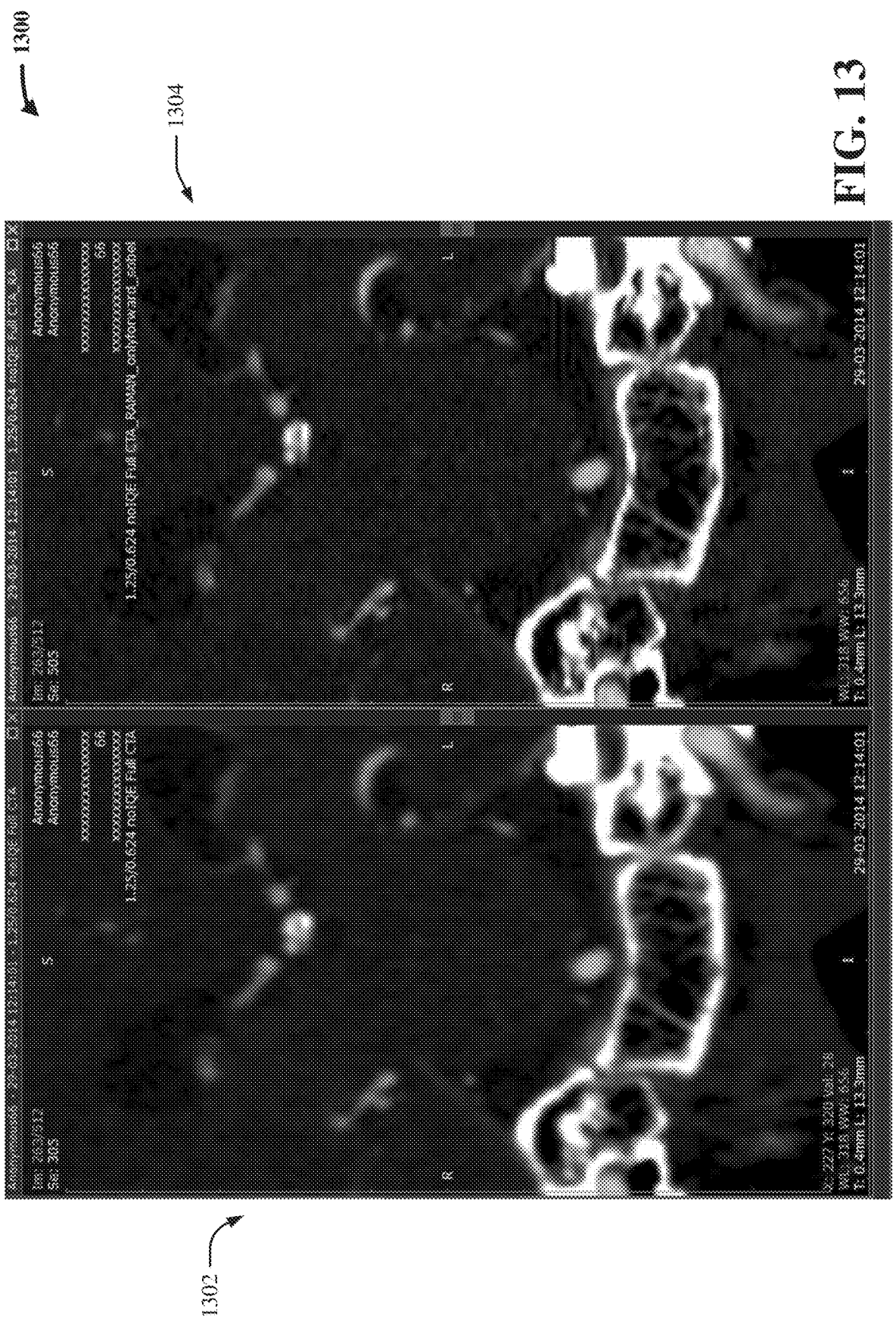

As yet another example, FIG. 13 shows a blurred image 1302 and a corresponding deblurred and/or less-blurred image 1304 generated by various embodiments of the subject innovation based on the blurred image 1302. As shown, the deblurred and/or less-blurred image 1304 is noticeably clearer and/or sharper than the blurred image 1302, which can aid in clinical diagnosis and/or prognosis.

Figure 14:
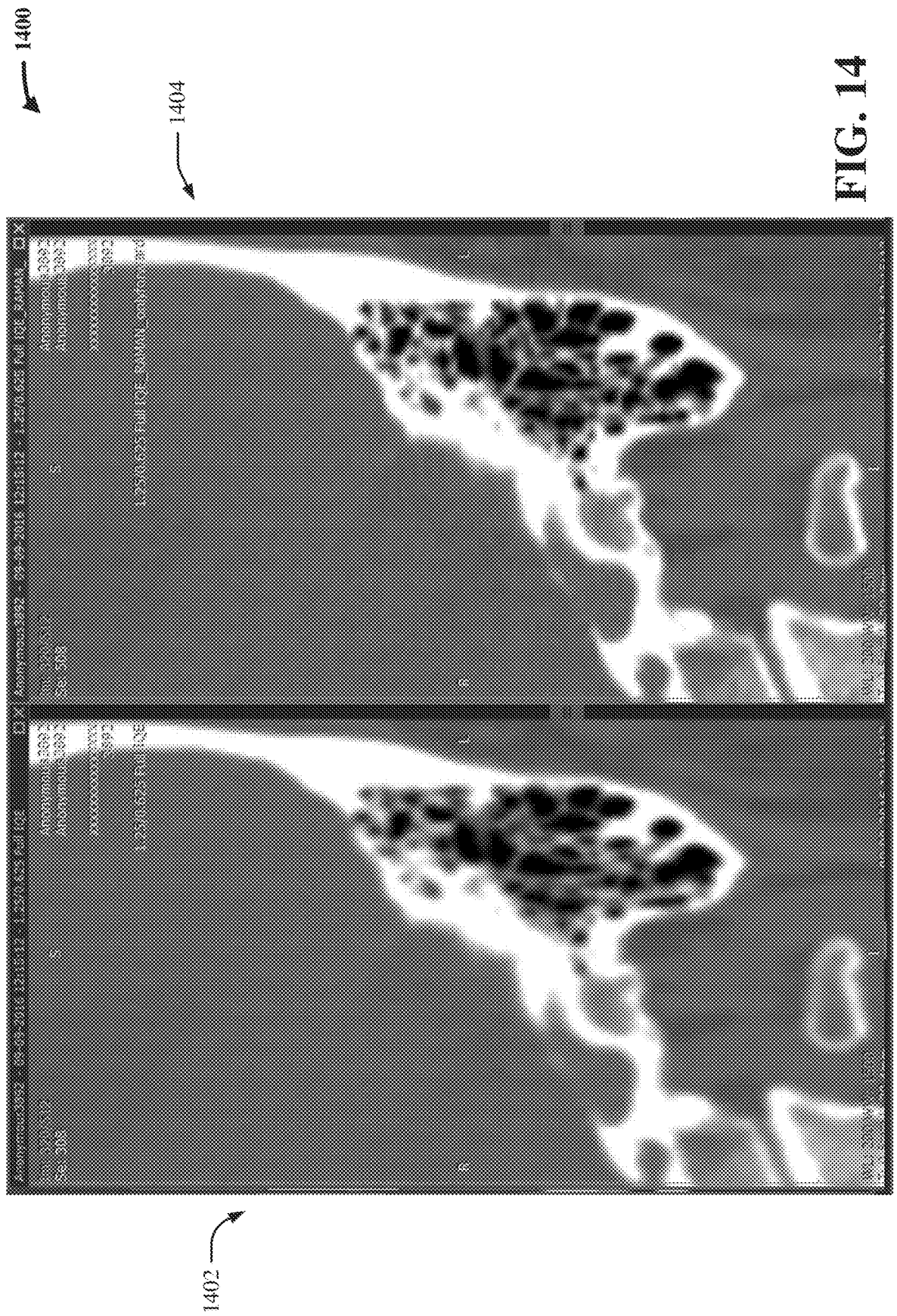

As still another example, FIG. 14 shows a blurred image 1402 and a corresponding deblurred and/or less-blurred image 1404 generated by various embodiments of the subject innovation based on the blurred image 1402. Once more, the deblurred and/or less-blurred image 1404 is noticeably clearer and/or sharper than the blurred image 1402.

To help further understand various embodiments of the subject innovation, consider the following discussion, which includes some mathematical notation, regarding various non-limiting embodiments of the subject innovation as applied to CT scans.

High resolution CT systems can enable high fidelity reconstruction of smaller structures and/or can produce detailed structural information for each tissue and/or pathology type. While this makes high resolution CT systems more useful, access and cost can make them unavailable in a number of locations and/or clinics. Thus, generating high-resolution images from low-resolution images would be beneficial in assisting clinicians with making more accurate diagnoses and/or prognoses.

The detector elements in a CT scanner can have non-ideal impulse response. Hence, the point spread function in the z-direction is usually much larger than the detector size itself. So, CT volumes that are reformatted in the x-z and/or y-z planes can appear blurred in the z-direction. In such a setting, an acquired volume can be equivalent to an underlying ideal volume blurred by a point spread function in the z-direction.

Several numerical schemes exist for deconvolution of signal/images. Usually, such methods try to find the optimal solution (e.g., the unblurred image) through a series of linear and/or non-linear operations. Some of such schemes include Winer deconvolution, Richardson-Lucy's algorithm, deconvolution methods with Tikhonov regularizer, statistical blind deconvolution methods, and/or deconvolution with alternating direction method of multipliers (ADMM). Unfortunately, such methods are iterative in nature, and thus computationally expensive/slow in practice. Moreover, such schemes require very careful manual parameter tuning to accomplish the desired accuracy for the deconvolved output.

Various deep learning methods exist to address resolution enhancement through supervised or semi-supervised learning between blurred (e.g., low-resolution) and sharper (e.g., high-resolution) images. Unfortunately, application of these methods is limited to learning from paired low-resolution and high-resolution images obtained from high-resolution CT scanners with retro-reconstruction, which might not be available in practice.

Accordingly, various embodiments of the subject innovation include a self-supervised deep learning method for removing and/or reducing the point spread function blur and improving resolution in the z-direction. However, those having ordinary skill in the art will appreciate that the herein techniques can be applied along any suitable axis, and are not limited to merely the z-direction. In various cases, embodiments of the subject innovation can learn to deconvolve the point spread function, which can be known a priori, from blurred images through a series of convolutional neural network layers with non-linear activations.

Since the point spread function can be defined in the z-direction, in order to under the point spread function blur, the image volumes can have to be deconvolved in the same direction (e.g., in the z-direction, if the point spread function is along the z-direction).

In various aspects, a blurred image y can be the result of convolving an underlying unknown unblurred and/or ideal image x with a known point spread function blur h (e.g., h can be the convolution kernel associated with the point spread function blur), where $$y[i]=(x*h)[i]+n[i]$$

where * represents a convolution operation, where i is a pixel and/or voxel index, and where n is uncorrelated random noise. In a typical variational formulation, an estimate $\hat{x}$ of the underlying unknown unblurred and/or ideal image x can be obtained, such that $\hat{x}*h$ is as close as possible (e.g., within any suitable threshold margin) to y. Additionally, the formulations can also include some prior knowledge about the true underlying unblurred and/or ideal image x.

Using vector notation, the solution $\hat{x}$ can be written as $$\hat{x} := \operatorname{argmin}_u \left( |y - Hu|^p + \sum_k \lambda_k \cdot \varphi_k(u) \right)$$

where H can be the convolution matrix operator associated with h (e.g., multiplying some image by H can yield the same result as convolving that image by h), where $\{\varphi_k(\cdot)\}$ can be functions that encode the prior information about x (e.g., such as total variation, smoothness regularization, feature loss, and/or adversarial loss), where p can be any suitable positive integer, where k can be the number of priors that are available, and/or where $\lambda_k$ can be weighting factors associated with each of the priors. Thus, $|y-Hu|^p$ can be considered as the fidelity term, and $\Sigma_k \lambda_k \cdot \varphi_k(u)$ can be considered as the prior term and/or the regularization term.

In various embodiments, the point spread function deblur can be performed by learning the pseudo-inverse of the convolution kernel h, which can be referred as to the deconvolution kernel $h^{-1}$. More specifically, various embodiments of the subject innovation can learn the deconvolution kernel $h^{-1}$ through a cyclic consistency network.

In various aspects, embodiments of the subject innovation can make use of the knowledge of h, which can be experimentally determined for a given set of scanners and/or corresponding images. In various cases, a deep learning model (e.g., 110), denoted as $\Psi(\cdot)$, can take as input a blurred image y and can process it with any suitable number of convolutional layers and/or activations without pooling. This can produce an estimated deblurred image $\Psi(\cdot)$. Ideally, $\Psi(\cdot) \approx H^\dagger y$, where $H^\dagger$ can be the pseudo-inverse of H. Hence, the deep learning model can produce $\hat{x} = \Psi(y) \approx H^\dagger y$, which can be considered as an estimate of the true deblurred and/or ideal ground truth image x.

Note that, at this stage, this is no real deblurred and/or ideal ground truth image x with which to compare the fidelity of $\hat{x}$. In order to address this, a cyclic consistency constraint can be implemented. Specifically, the image $\hat{x}$ can be convolved (e.g., via 118) with h, to produce $\hat{y}$. In various cases, $\hat{y}$ can be considered as a re-blurred and/or pseudo-blurred version of the image $\hat{x}$. In various cases, $\hat{y}$ should be as close as possible (e.g., within any suitable threshold margin) to the original blurred image y. Thus, the error/loss function can be formulated as $$L = |y - \hat{y}|^p + \sum_k \lambda_k \cdot \varphi_k(\hat{x})$$

In various cases, to stabilize even further, the image $\hat{y}$ be re-fed to the deep learning model $\Psi(\cdot)$, and/or can equivalently be fed to a duplicate and/or copy of the deep learning model $\Psi(\cdot)$, which can produce $\check{x}$. In various cases, $\check{x}$ can be considered as a re-estimated deblurred image. Accordingly, $\check{x}$ should be as close as possible (e.g., within any suitable threshold margin) to $\hat{x}$. Thus, the error/loss function can be reformulated as $$L = |y - \hat{y}|^p + |\hat{x} - \check{x}|^p + \sum_k \lambda_k \cdot \varphi_k(\hat{x})$$

In any case, the error/loss function can refrain from depending upon the deblurred and/or ideal ground truth x. Even though the prior $\varphi_k(\cdot)$ can be formulated to be operating on the high-resolution estimate $\hat{x}$, it can more generally be a function that takes in auxiliary data and drives the regularization of the network. For example, $\varphi_k(\cdot)$ could be VGG-based feature loss and/or adversarial loss.

In various cases, the above formulations can be implemented when it is desired to eliminate all blurring (e.g., to remove the entire point spread function) from the original blurred image y. However, such extensive deblurring can sometimes come at the cost of extended training time and/or training instability. Accordingly, in some cases, it can be desired to eliminate less than all blurring (e.g., to remove less than the entire point spread function) from the original blurred image y.

In such case, a blurred image y generated by a low-resolution imaging device can be the result obtained by convolving an underlying unblurred and/or ideal image x with a convolution matrix $H_{LR}$ corresponding to the low-resolution imaging device. That is, $y = H_{LR}x$. As those having ordinary skill in the art will appreciate, $H_{LR}$ can be obtained experimentally, empirically, and/or parametrically from the low-resolution imaging device. Suppose that a higher-resolution imaging device were to capture an image of the underlying unblurred and/or ideal image x. That is, the higher-resolution imaging device can convolve the underlying unblurred and/or ideal image x with a convolution matrix $H_{HR}$ corresponding to the higher-resolution imaging device, thereby resulting in an image m. In other words, $m = H_{HR}x$. As those having ordinary skill in the art will appreciate, $H_{HR}$ can be obtained experimentally, empirically, and/or parametrically from the higher-resolution imaging device. In various cases, the image m can be more blurred than the underlying unblurred and/or ideal image x, but the image m can also be less blurred than the blurred image y. Accordingly, there can exist some residual blur matrix $H_d$ which, when convolved with the image m, yields the image y. That is, $y = H_{LR}x = H_d m = (H_d * H_{HR})x$. Since both $H_{LR}$ and $H_{HR}$ can be experimentally, empirically, and/or parametrically obtained, they can be utilized to solve for the residual blur matrix $H_d$.

Accordingly, the blurred image y can be the result of convolving the less-blurred image m with a known residual point spread function blur $h_d$ (e.g., $h_d$ can be the convolution kernel associated with the residual point spread function blur; that is, $h_d$ can be the convolution kernel corresponding to the convolution matrix $H_d$), where $$y[i] = (m * h_d)[i] + n[i]$$

where * represents a convolution operation, where i is a pixel and/or voxel index, and where n is uncorrelated random noise. In a typical variational formulation, an estimate $\hat{m}$ of the underlying less-blurred image m can be obtained, such that $\hat{m} * h_d$ is as close as possible (e.g., within any suitable threshold margin) to y. Additionally, the formulations can also include some prior knowledge about the less-blurred image m.

Using vector notation, the solution $\hat{m}$ can be written as $$\hat{m} := \operatorname{argmin}_u \left( |y - H_d u|^p + \sum_k \lambda_k \cdot \varphi_k(u) \right)$$

where $H_d$ can be the convolution matrix operator associated with $h_d$, where $\{\varphi_k(\cdot)\}$ can be functions that encode the prior information about m (e.g., such as total variation, smoothness regularization, feature loss, and/or adversarial loss), where p can be any suitable positive integer, where k can be the number of priors that are available, and/or where $\lambda_k$ can be weighting factors associated with each of the priors. Thus, $|y - H_d u|^p$ can be considered as the fidelity term, and $\Sigma_k \lambda_k \cdot \varphi_k(u)$ can be considered as the prior term and/or regularization term.

In various embodiments, the point spread function deblur can be performed by learning the pseudo-inverse of the residual convolution kernel $h_d$, which can be referred to as the deconvolution kernel $h_d^{-1}$. More specifically, various embodiments of the subject innovation can learn the deconvolution kernel $h_d^{-1}$ through a cyclic consistency network.

In various aspects, embodiments of the subject innovation can make use of the knowledge of $h_d$. In various cases, a deep learning model (e.g., 110), denoted as $\Psi(\cdot)$, can take as input a blurred image y and can process it with any suitable number of convolutional layers and/or activations without pooling. This can produce an estimated deblurred image $\Psi(\cdot)$. Ideally, $\Psi(y) \approx H_d^\dagger y$, where $H_d^\dagger$ can be the pseudo-inverse of $H_d$. Hence, the deep learning model can produce $\hat{m} = \Psi(y) \approx H_d^\dagger y$, which can be considered as an estimate of the less-blurred and/or higher-resolution image m.

Note that, at this stage, this is no real less-blurred and/or higher-resolution image m with which to compare the fidelity of $\hat{m}$. In order to address this, a cyclic consistency constraint can be implemented. Specifically, the image $\hat{m}$ can be convolved (e.g., via 118) with $h_d$, to produce $\hat{y}$. In various cases, $\hat{y}$ can be considered as re-blurred and/or pseudo-blurred version of the image $\hat{m}$. In various cases, $\hat{y}$ should be as close as possible (e.g., within any suitable threshold margin) to the original blurred image y. Thus, the error/loss function can be formulated as $$L = |y - \hat{y}|^p + \sum_k \lambda_k \cdot \varphi_k(\hat{m}) + PSF_{Loss}$$

As shown, the loss function L can be offset by a term $PSF_{Loss}$ (e.g., "point spread function loss"), which can represent any suitable measure of a shape difference between the point spread function corresponding to $H_{LR}$ (e.g., the known low-resolution point spread function) and $H_{HR}$ (e.g., the known high-resolution point spread function). As those having ordinary skill in the art will appreciate, such shape difference can, for example, be defined in terms of a kurtosis difference between the low-resolution point spread function and the high-resolution point spread function, a monotonicity difference between the low-resolution point spread function and the high-resolution point spread function, a FWHM difference between the low-resolution point spread function and the high-resolution point spread function, and/or a Fourier/wavelet difference between the low-resolution point spread function and the high-resolution point spread function. Thus, the term $PSF_{Loss}$ can be considered as accounting for the difference between the point spread function implemented that generates the blurred image y and the residual point spread function that generates the less-blurred image $\hat{m}$.

In various cases, to stabilize even further, the image 5 be re-fed to the deep learning model $\Psi(\cdot)$, and/or can equivalently be fed to a duplicate and/or copy of the deep learning model $\Psi(\cdot)$, which can produce $\check{m}$. In various cases, $\check{m}$ can be considered as a re-estimated less-blurred image. Accordingly, $\check{m}$ should be as close as possible (e.g., within any suitable threshold margin) to $\hat{m}$. Thus, the error/loss function can be reformulated as $$L = |y - \hat{y}|^p + |\hat{m} - \check{m}|^p + \sum_k \lambda_k \cdot \varphi_k(\hat{m}) + PSF_{Loss}$$

In any case, the error/loss function can refrain from depending upon the unknown less-blurred ground truth m. Even though the prior $\varphi_k(\cdot)$ can be formulated to be operating on the high-resolution estimate $\hat{m}$, it can more generally be a function that takes in auxiliary data and drives the regularization of the network, such as VGG-based feature loss and/or adversarial loss.

Thus, as described above, various embodiments of the subject innovation can be implemented so as to train a deep learning model to estimate a fully deblurred version of a blurred image (e.g., so as to estimate x). In some cases, various other embodiments of the subject innovation can be implemented so as to train a deep learning model to estimate a less-blurred (but not fully-deblurred) version of a blurred image (e.g., so as to estimate m).

In various aspects, the inventors of various embodiments of the subject innovation experimentally verified the efficacy of the herein teachings. Specifically, a CT scanner with native detector size of 1.25 millimeters was trained in a self-supervised fashion as described herein. The point spread function of the CT scanner was experimentally estimated via a gold-foil phantom experiment, using a piece of gold foil having a diameter of 1 millimeter and a thickness of 0.025 millimeters that was embedded in a tissue-equivalent plastic cylinder. Based on such experiment, the estimated FWHM of the CT scanner was 1.94 millimeters. Training and validation datasets were obtained by performing overlapping reconstruction with 0.4883 millimeters in-plane resolution and 0.625 millimeters slice spacing. To reduce z-direction blurring, coronal and sagittal slices were used in training. A total number of 5000 random image patches with size 256×128 were generated for training. Ten percent of those were separated and used for validation, while the rest were used for training. Also, to reduce edge artifacts, the image patches were padded with reflection padding before being fed to the network. The training was performed with a mean absolute error (MAE) loss function and was run for 500 epochs with batch size of 16, and an initial learning rate of 2e-4 that decayed exponentially at every epoch. During inferencing, only the deep learning network is used (e.g., the convolution layer implementing h and/or $h_d$ can be not utilized during inferencing). Testing of the trained deep learning network verified that significant deblurring accuracy was obtained (e.g., as shown in FIGS. 11-14). Moreover, such testing verified that Hounsfield unit value integrity was maintained by the trained deep learning network.

Figure 15:
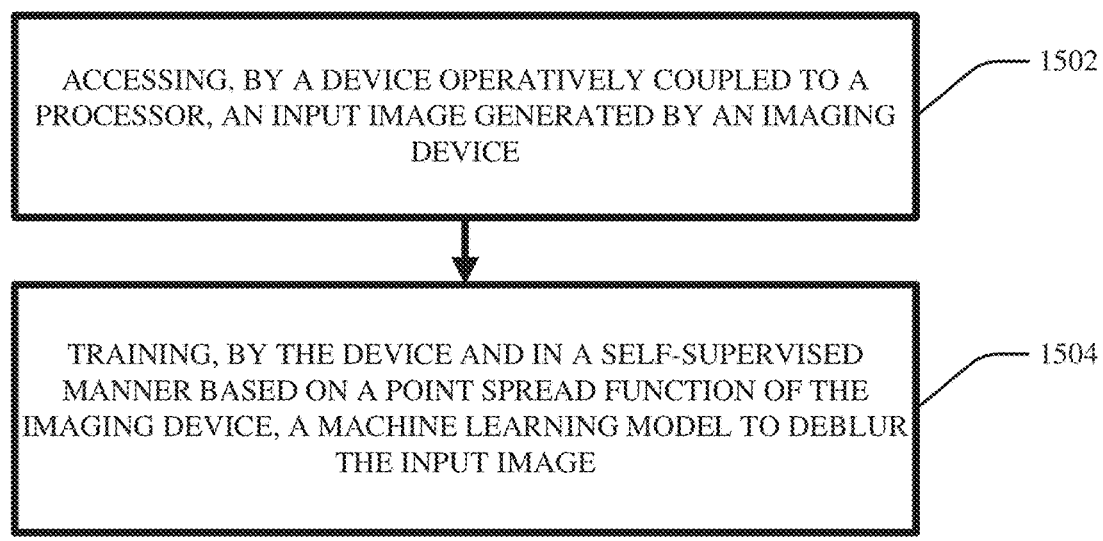
FIG. 15 illustrates a flow diagram of an example, non-limiting computer-implemented method that facilitates self-supervised deblurring in accordance with one or more embodiments described herein.

FIG. 15 illustrates a flow diagram of an example, non-limiting computer-implemented method 1500 that can facilitate self-supervised deblurring in accordance with one or more embodiments described herein. In various cases, the computer-implemented method 1500 can be facilitated by the self-supervised deblurring system 102.

In various embodiments, act 1502 can include accessing, by a device (e.g., 116) operatively coupled to a processor, an input image (e.g., 108) generated by an imaging device (e.g., 104).

In various aspects, act 1504 can include training, by the device (e.g., 118) and in a self-supervised manner based on a point spread function (e.g., 106) of the imaging device, a machine learning model (e.g., 110) to deblur the input image.

Although not explicitly shown in FIG. 15, the training the machine learning model can comprise: appending, by the device (e.g., 116), one or more non-trainable convolution layers (e.g., 202) to the machine learning model, wherein the one or more non-trainable convolution layers have a blur kernel that is based on the point spread function of the imaging device.

Although not explicitly shown in FIG. 15, the blur kernel can approximate a blur corresponding to the point spread function of the imaging device.

Although not explicitly shown in FIG. 15, the blur kernel an approximate a blur corresponding to a residual difference between the point spread function of the imaging device and another point spread function (e.g., 402) of a higher-resolution imaging device.

Although not explicitly shown in FIG. 15, the training the machine learning model can further comprise: feeding, by the device (e.g., 118), the input image to the machine learning model, wherein the machine learning model generates a first output image (e.g., 502) based on the input image, and wherein the one or more non-trainable convolution layers generate a second output image (e.g., 504) by convolving the first output image with the blur kernel; and updating, by the device (e.g., 118), parameters of the machine learning model based on a difference between the input image and the second output image.

Although not explicitly shown in FIG. 15, the updating the parameters of the machine learning model can be further based on a shape loss (e.g., $PSF_{Loss}$) between the point spread function (e.g., 106) of the imaging device and a higher-resolution point spread function (e.g., 402), wherein the shape loss is defined by at least one of a difference between a full-width-half-maximum of the point spread function and a full-width-half-maximum of the higher-resolution point spread function, a difference between a monotonicity of the point spread function and a monotonicity of the higher-resolution point spread function, a difference between a kurtosis of the point spread function and a kurtosis of the higher-resolution point spread function, or a difference between a Fourier/wavelet descriptor of the point spread function and a Fourier/wavelet descriptor of the higher-resolution point spread function.

Although not explicitly shown in FIG. 15, the training the machine learning model can further comprise: appending, by the device (e.g., 118), a copy of the machine learning model (e.g., 702) to the one or more non-trainable convolution layers; feeding, by the device (e.g., 118), the input image to the machine learning model, wherein the machine learning model generates a first output image (e.g., 502) based on the input image, wherein the one or more non-trainable convolution layers generate a second output image (e.g., 504) by convolving the first output image with the blur kernel, and wherein the copy of the machine learning model generates a third output image (e.g., 802) based on the second output image; and updating, by the device (e.g., 118), parameters of the machine learning model based on a first difference between the input image and the second output image and based on a second difference between the first output image and the third output image.

Although not explicitly shown in FIG. 15, the point spread function of the imaging device can be estimated based on characteristics or settings of the imaging device.

The herein disclosure has described various embodiments in which the machine learning model 110 can be trained, via the non-trainable convolution layer 202 whose blur kernel is based on the point spread function 106, to receive as input a blurred image (e.g., 1002) and to produce as output a deblurred and/or less-blurred version (e.g., 1004) of the blurred image. In various embodiments, however, performance of the machine learning model 110 can be improved by configuring the machine learning model 110 to receive as an additional input a blur kernel that is related to the blur kernel of the non-trainable convolution layer 202. This is further explained with respect to FIG. 16.

Figure 16:
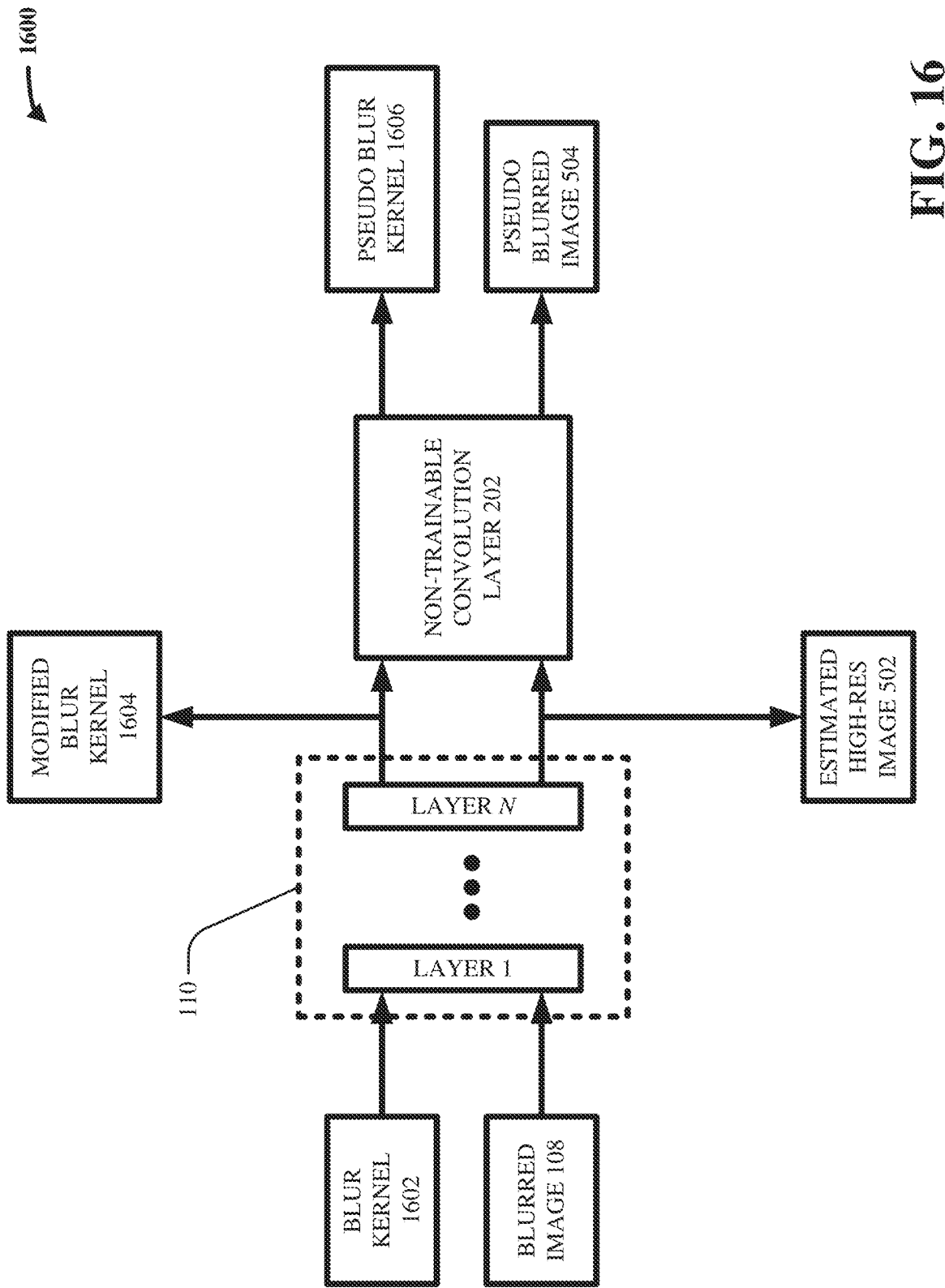
FIG. 16 illustrates an example, non-limiting block diagram showing how a non-trainable convolution layer can be implemented for self-supervised deblurring in accordance with one or more embodiments described herein.

FIG. 16 illustrates an example, non-limiting block diagram 1600 showing how a non-trainable convolution layer can be implemented for self-supervised deblurring in accordance with one or more embodiments described herein. More specifically, FIG. 16 depicts how the training component 118 can leverage the non-trainable convolution layer 202 to train the machine learning model 110 in a self-supervised fashion, where the machine learning model 110 can be configured to receive as input both a blurred image and a blur kernel.

In various embodiments, as shown, the machine learning model 110, which can comprise n layers for any suitable positive integer n, can be coupled in series with the non-trainable convolution layer 202. In various instances, as explained above, the training component 118 can feed the blurred image 108 to the machine learning model 110. However, as shown, the training component 118 can also feed a blur kernel 1602 to the machine learning model 110. In various cases, the blur kernel 1602 can be any suitable convolution kernel having any suitable dimensionality (e.g., 3×3, 5×5) and/or any suitable numerical elements. In various aspects, the blur kernel 1602 can be related to and/or otherwise based on the blur kernel of the non-trainable convolution layer 202. In any case, the machine learning model 110 can generate the estimated high-res image 502 based on the blurred image 108, as described above, and can also generate a modified blur kernel 1604 based on the blur kernel 1602 (e.g., the blur kernel 1602 can be fed forward through the layers of the machine learning model 110, so as to yield the modified blur kernel 1604). In various cases, the dimensionality of the modified blur kernel 1604 can be equal to that of the blur kernel 1602, but the numerical elements of the modified blur kernel 1604 can be different from those of the blur kernel 1602.

In various aspects, as shown, the non-trainable convolution layer 202 can be configured to receive both the estimated high-res image 502 and the modified blur kernel 1604. In various instances, the non-trainable convolution layer 202 can convolve the estimated high-res image 502 with its blur kernel, which can result in the pseudo-blurred image 504. Likewise, the non-trainable convolution layer 202 can also convolve the modified blur kernel 1604 with its blur kernel, which can result in the pseudo blur kernel 1606. Just as it can be desired to minimize a difference/distinction between the pseudo blurred image 504 and the blurred image 108, it can similarly be desired to minimize a difference/distinction between the pseudo blur kernel 1606 and the blur kernel 1602.

Accordingly, the training component 118 can compute an error/loss between the pseudo-blurred image 504 and the blurred image 108, and can compute at least one more error/loss between the pseudo blur kernel 1606 and the blur kernel 1602. Such at least one more error/loss can provide an additional regularizing and/or constraining effect on the machine learning model 110. Based on such errors/losses, the training component 118 can update, via backpropagation, the internal parameters (e.g., weights, biases) of the machine learning model 110, again without any known ground truth. Moreover, as explained above, the blur kernel of the non-trainable convolution layer 202 can remain unchanged during such backpropagation.

In various aspects, the training component 118 can repeat this training procedure for any suitable number of blurred images generated by the imaging device 104, which can ultimately cause the internal parameters of the machine learning model 110 to be iteratively optimized. Once its internal parameters are optimized, the machine learning model 110 can accurately deblur (e.g., eliminate and/or reduce blur in) images generated by the imaging device 104. Those having ordinary skill in the art will understand that any suitable number and/or sizes of training batches and/or training epochs can be implemented as desired.

In various cases, at least two particular embodiments of FIG. 16 can be implemented: a first embodiment where the blur kernel of the non-trainable convolution layer 202 is configured to mimic and/or approximate the point spread function 106; and a second embodiment where the blur kernel of the non-trainable convolution layer 202 is configured to mimic and/or approximate the residual difference between the point spread function 106 and the target point spread function 402 (e.g., some higher-resolution and/or sharper point spread function).

Consider the first embodiment. Let the blurred image 108 be represented by y, let the machine learning model 110 be represented by Ψ(·), let the blur kernel of the non-trainable convolution layer 202 be represented by h, and let the pseudo blurred image 504 be represented by ŷ. Furthermore, in the first embodiment, the blur kernel 1602 can be equal to h.

As explained above, the blurred image y can be considered as the result obtained by convolving some unknown ideal image x by h. In various cases, the blurred image y can be operated on by the model Ψ(·) (e.g., 110), thereby yielding an estimated deblurred image x̂ (e.g., 502), which can be considered as the model's estimation of x.

Note that, since x is unknown, a direct error/loss for x̂ cannot be computed. To solve this issue, a cyclic consistency constraint can be implemented. Specifically, the estimated deblurred image x̂ can be convolved by h (e.g., via 202), thereby yielding the pseudo blurred image ŷ (e.g., 504). Thus, an error/loss function can depend upon a difference/distinction between y and ŷ.

To further constrain the error/loss function, the model Ψ(·) (e.g., 110) can be fed h (e.g., the blur kernel 1602) as an input, which can result in the modified blur kernel 1604, which can be represented by δ̂. In various instances, the modified blur kernel δ̂ can then be convolved by h (e.g., via 202), which can result in the pseudo blur kernel 1606, which can be represented by ĥ. Therefore, the error/loss function can depend not only upon a difference/distinction between y and ŷ, but can also depend upon a difference/distinction between h (e.g., 1602) and ĥ (e.g., 1606). Specifically, because h and ĥ are both convolution kernels, they can each represent a corresponding point spread function. Thus, the difference/distinction between h and ĥ can be quantified in terms of the difference between the FWHM of the point spread function associated with h and the FWHM of the point spread function associated with ĥ, in terms of the difference between the kurtosis of the point spread function associated with h and the kurtosis of the point spread function associated with ĥ, in terms of the difference between the monotonicity of the point spread function associated with h and the monotonicity of the point spread function associated with ĥ, and/or in terms of the difference between the Fourier and/or wavelet descriptors of the point spread function associated with h and the Fourier and/or wavelet descriptors of the point spread function associated with ĥ.

Thus, the error/loss function can be formulated as $$L = |y - \hat{y}|^p + \sum_k \lambda_k \cdot \varphi_k(\hat{x}) + \text{Shape}_{Loss}$$

where $\Sigma_k \lambda_k \cdot \varphi_k(\hat{x})$ is the regularization/prior term, and where $\text{Shape}_{Loss}$ captures the shape difference (e.g., as measured via FWHM, kurtosis, monotonicity, Fourier, wavelet) between h and ĥ. Backpropagation can then be facilitated on the model Ψ(·).

Now consider the second embodiment. Let the blurred image 108 be represented by y, let the machine learning model 110 be represented by Ψ(·), and let the pseudo blurred image 504 be represented by ŷ. Moreover, in the second embodiment, the blur kernel of the non-trainable convolution layer 202 can be represented by $h_d$, where $h_d$ is the convolution kernel that is configured to mimic and/or approximate the residual difference between the point spread function 106 and the target point spread function 402. Furthermore, the point spread function 106 can be referred to as a low-resolution point spread function that is implemented by a low-resolution convolution kernel $h_{LR}$, and the target point spread function 402 can be referred to as a high-resolution point spread function that is implemented by a high-resolution convolution kernel $h_{HR}$. In various cases, since $h_d$ can represent the residual difference between $h_{LR}$ and $h_{HR}$, it can be the case that $h_{LR} = h_d * h_{HR}$. Thus, by knowing $h_{LR}$ and $h_{HR}$, $h_d$ can be computed. Further still, in the second embodiment, the blur kernel 1602 can be equal to $h_{LR}$.

As explained above, the blurred image y can be considered as the result obtained by convolving some unknown ideal image x by h. In various cases, the blurred image y can be operated on by the model Ψ(·) (e.g., 110), thereby yielding an estimated deblurred image x̂ (e.g., 502), which can be considered as the model's estimation of x.

Note that, since x is unknown, a direct error/loss for x̂ cannot be computed. To solve this issue, a cyclic consistency constraint can be implemented. Specifically, the estimated deblurred image x̂ can be convolved by h (e.g., via 202), thereby yielding the pseudo blurred image ŷ (e.g., 504). Thus, an error/loss function can depend upon a difference/distinction between y and ŷ.

To further constrain the error/loss function, the model Ψ(·) (e.g., 110) can be fed $h_{LR}$ (e.g., the blur kernel 1602) as an input, which can result in the modified blur kernel 1604, which can be represented by $\widehat{h_{HR}}$. In various instances, the modified blur kernel $\widehat{h_{HR}}$ can then be convolved by $h_d$ (e.g., via 202), which can result in the pseudo blur kernel 1606, which can be represented by $\widehat{h_{LR}}$. Therefore, the error/loss function can depend not only upon a difference/distinction between y and ŷ, but can also depend upon a first difference/distinction between $h_{LR}$ (e.g., 1602) and $\widehat{h_{LR}}$ (e.g., 1606), as well as upon a second different/distinction between $h_{HR}$ (e.g., 402) and $\widehat{h_{HR}}$ (e.g., 1604). Specifically, because $h_{LR}$ and $\widehat{h_{LR}}$ are both convolution kernels, they can each represent a corresponding point spread function. Thus, the difference/distinction between $h_{LR}$ and $\widehat{h_{LR}}$ can be quantified in terms of the difference between the FWHM of the point spread function associated with $H_{LR}$ and the FWHM of the point spread function associated with $\widehat{h_{LR}}$, in terms of the difference between the kurtosis of the point spread function associated with $h_{LR}$ and the kurtosis of the point spread function associated with $\widehat{h_{LR}}$, in terms of the difference between the monotonicity of the point spread function associated with $h_{LR}$ and the monotonicity of the point spread function associated with $\widehat{h_{LR}}$, and/or in terms of the difference between the Fourier and/or wavelet descriptors of the point spread function associated with $h_{LR}$ and the Fourier and/or wavelet descriptors of the point spread function associated with $\widehat{h_{LR}}$.

Likewise, because $h_{HR}$ and $\widehat{h_{LR}}$ are both convolution kernels, they can each represent a corresponding point spread function. Thus, the difference/distinction between $h_{HR}$ and $\widehat{h_{LR}}$ can be quantified in terms of the difference between the FWHM of the point spread function associated with $h_{HR}$ and the FWHM of the point spread function associated with $\widehat{h_{LR}}$, in terms of the difference between the kurtosis of the point spread function associated with $h_{HR}$ and the kurtosis of the point spread function associated with $\widehat{h_{LR}}$, in terms of the difference between the monotonicity of the point spread function associated with $h_{HR}$ and the monotonicity of the point spread function associated with $\widehat{h_{LR}}$, and/or in terms of the difference between the Fourier and/or wavelet descriptors of the point spread function associated with $h_{HR}$ and the Fourier and/or wavelet descriptors of the point spread function associated with $\widehat{h_{LR}}$.

Thus, the error/loss function can be formulated as $$L = |y - \hat{y}|^p + \sum_k \lambda_k \cdot \varphi_k(\hat{x}) + \text{Shape}_{Loss}^{LR} + \text{Shape}_{Loss}^{HR}$$

where $\Sigma_k \lambda_k \cdot \varphi_k(\hat{x})$ is the regularization/prior term, where $\text{Shape}_{Loss}^{LR}$ captures the shape difference (e.g., as measured via FWHM, kurtosis, monotonicity, Fourier, wavelet) between $h_{LR}$ and $\widehat{h_{LR}}$, and where $\text{Shape}_{Loss}^{HR}$ captures the shape difference (e.g., as measured via FWHM, kurtosis, monotonicity, Fourier, wavelet) between $h_{HR}$ and $\widehat{h_{HR}}$. Backpropagation can then be facilitated on the model $\Psi(\cdot)$.

In various aspects, the details associated with FIG. 16 can be incorporated into the computer-implemented method 1500 shown in FIG. 15.

As explained above, act 1502 can include accessing, by a device (e.g., 116) operatively coupled to a processor, an input image (e.g., 108) generated by an imaging device (e.g., 104).

As also explained above, act 1504 can include training, by the device (e.g., 118) and in a self-supervised manner based on a point spread function (e.g., 106) of the imaging device, a machine learning model (e.g., 110) to deblur the input image.

As mentioned above, although not explicitly shown in FIG. 15, the training the machine learning model can comprise: appending, by the device (e.g., 116), one or more non-trainable convolution layers (e.g., 202) to the machine learning model, wherein the one or more non-trainable convolution layers have a blur kernel that is based on the point spread function of the imaging device.

As also mentioned above, although not explicitly shown in FIG. 15, the training the machine learning model can further comprise: feeding, by the device (e.g., 118), the input image to the machine learning model, wherein the machine learning model generates a first output image (e.g., 502) based on the input image, and wherein the one or more non-trainable convolution layers generate a second output image (e.g., 504) by convolving the first output image with the blur kernel; and updating, by the device (e.g., 118), parameters of the machine learning model based on a difference between the input image and the second output image.

Although not explicitly shown in FIG. 15, the computer-implemented method 1500 can further comprise: feeding, by the device (e.g., 118), a low-resolution blur kernel (e.g., 1602, h, and/or $h_{LR}$) to the machine learning model, wherein the low-resolution blur kernel can approximate a blur corresponding to the point spread function (e.g., 106) of the imaging device, wherein the machine learning model can generate a modified blur kernel (e.g., 1604, $\hat{\delta}$, and/or $\widehat{h_{HR}}$) based on the low-resolution blur kernel, and wherein the one or more non-trainable convolution layers (e.g., 202) can generate a pseudo-low-resolution blur kernel (e.g., 1606, $\hat{h}$, and/or $\widehat{h_{LR}}$) by convolving the modified blur kernel with the blur kernel; and updating, by the device (e.g., 118), the parameters of the machine learning model based on a first shape loss (e.g., $\text{Shape}_{Loss}$ and/or $\text{Shape}_{Loss}^{LR}$) between the low-resolution blur kernel and the pseudo-low-resolution blur kernel, and wherein the first shape loss can be defined by at least one of a full-width-half-maximum difference, a monotonicity difference, a kurtosis difference, a Fourier descriptor difference, or a wavelet descriptor difference between the low-resolution blur kernel and the pseudo-low-resolution blur kernel.

Although not explicitly shown in FIG. 15, the computer-implemented method 1500 can further include: updating, by the device (e.g., 118), the parameters of the machine learning model based on a second shape loss (e.g., $\text{Shape}_{Loss}^{HR}$) between the modified blur kernel (e.g., 1604 and/or $\widehat{h_{HR}}$) and a high-resolution blur kernel (e.g., $h_{HR}$) that approximates a blur corresponding to a target high-resolution point spread function (e.g., 402), and wherein the second shape loss can be defined by at least one of a full-width-half-maximum difference, a monotonicity difference, a kurtosis difference, a Fourier descriptor difference, or a wavelet descriptor difference between the high-resolution blur kernel and the modified blur kernel.

Although the herein disclosure mainly describes the blurred image 108 as being generated by the imaging device 104, this is a mere non-limiting example. Those having ordinary skill in the art will appreciate that, in some cases, the blurred image 108 can be artificially and/or synthetically fabricated via any suitable software rather than being generated by the imaging device 104. In such case, the point spread function 106 can be any suitably defined point spread function implemented by such software (e.g., in some cases, the point spread function 106 can be manually defined by an operator/technician).

Various embodiments described herein can include a computerized tool that can facilitate self-supervised training of a deep learning deblurring model, without relying on annotated ground truths. The computerized tool can facilitate such self-supervised training by implementing a non-trainable convolution layer whose kernel/filter is based on a point spread function of an imaging device. More specifically, a blurred image can be fed to the deep learning deblurring model, which can produce an estimated deblurred and/or less-blurred version of the blurred image. In various cases, the non-trainable convolution layer can convolve the estimated deblurred and/or less-blurred image, thereby yielding a pseudo-blurred image. In various aspects, the computerized tool can update parameters of the deep learning deblurring model based on a difference/error between the pseudo-blurred image and the original blurred image.

Those having ordinary skill in the art will appreciate that the herein disclosure describes non-limiting examples of various embodiments of the invention. For ease of description and/or explanation, various portions of the herein disclosure utilize the term "each" when discussing various embodiments of the invention. Those having ordinary skill in the art will appreciate that such usages of the term "each" are non-limiting examples. In other words, when the herein disclosure provides a description that is applied to "each" of some particular computerized object and/or component, it should be understood that this is a non-limiting example of various embodiments of the invention, and it should be further understood that, in various other embodiments of the invention, it can be the case that such description applies to fewer than "each" of that particular computerized object.

Figure 17:
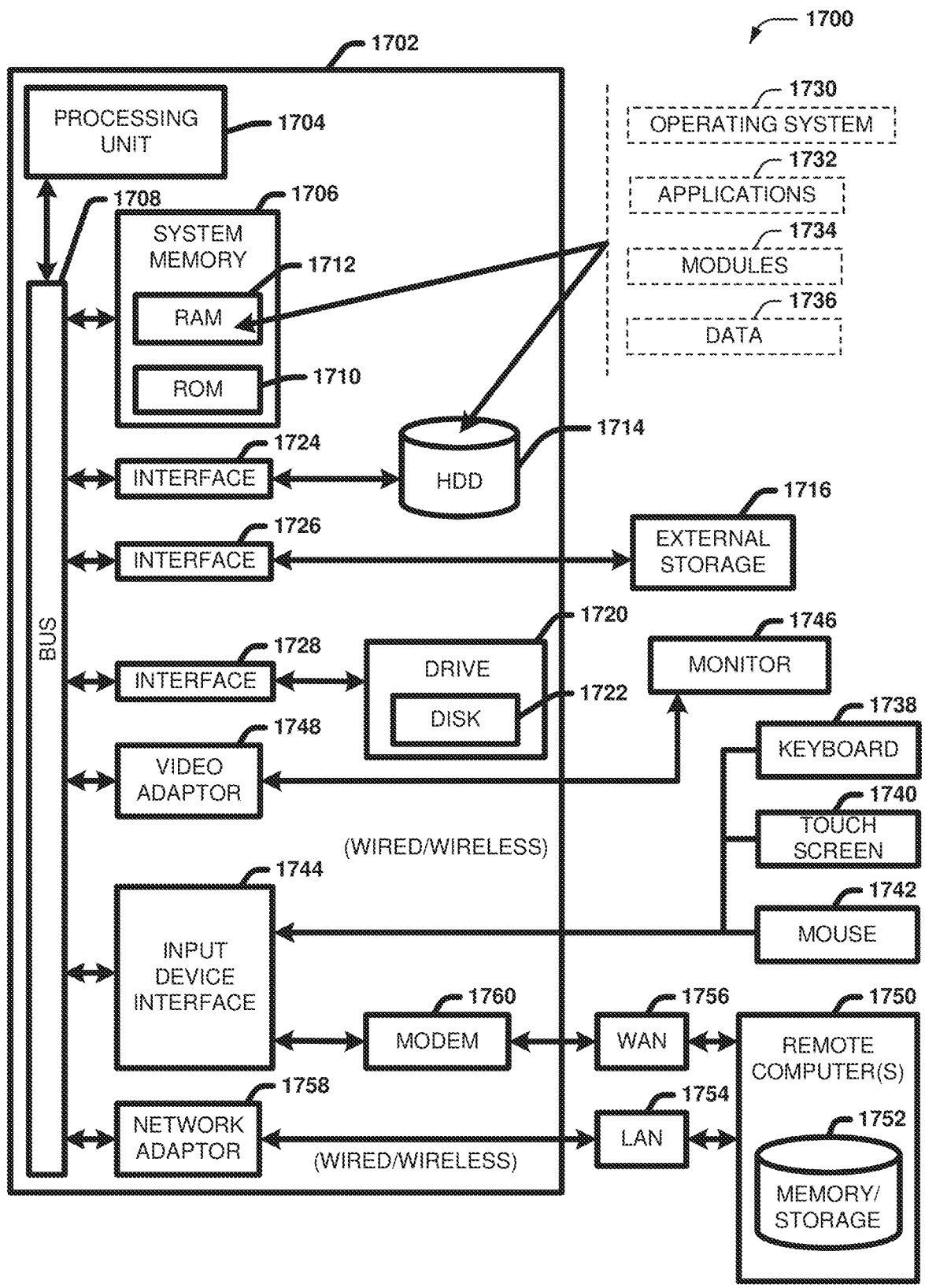
FIG. 17 illustrates a block diagram of an example, non-limiting operating environment in which one or more embodiments described herein can be facilitated.

In order to provide additional context for various embodiments described herein, FIG. 17 and the following discussion are intended to provide a brief, general description of a suitable computing environment 1700 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various embodiments of the aspects described herein includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes ROM 1710 and RAM 1712. A basic input/output system (BIOS) can be stored in a non-volatile memory such as ROM, erasable programmable read only memory (EPROM), EEPROM, which BIOS contains the basic routines that help to transfer information between elements within the computer 1702, such as during startup. The RAM 1712 can also include a high-speed RAM such as static RAM for caching data.

The computer 1702 further includes an internal hard disk drive (HDD) 1714 (e.g., EIDE, SATA), one or more external storage devices 1716 (e.g., a magnetic floppy disk drive (FDD) 1716, a memory stick or flash drive reader, a memory card reader, etc.) and a drive 1720, e.g., such as a solid state drive, an optical disk drive, which can read or write from a disk 1722, such as a CD-ROM disc, a DVD, a BD, etc. Alternatively, where a solid state drive is involved, disk 1722 would not be included, unless separate. While the internal HDD 1714 is illustrated as located within the computer 1702, the internal HDD 1714 can also be configured for external use in a suitable chassis (not shown). Additionally, while not shown in environment 1700, a solid state drive (SSD) could be used in addition to, or in place of, an HDD 1714. The HDD 1714, external storage device(s) 1716 and drive 1720 can be connected to the system bus 1708 by an HDD interface 1724, an external storage interface 1726 and a drive interface 1728, respectively. The interface 1724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. The systems and methods described herein can be implemented utilizing various commercially available operating systems or combinations of operating systems.

Computer 1702 can optionally comprise emulation technologies. For example, a hypervisor (not shown) or other intermediary can emulate a hardware environment for operating system 1730, and the emulated hardware can optionally be different from the hardware illustrated in FIG. 17. In such an embodiment, operating system 1730 can comprise one virtual machine (VM) of multiple VMs hosted at computer 1702. Furthermore, operating system 1730 can provide runtime environments, such as the Java runtime environment or the .NET framework, for applications 1732. Runtime environments are consistent execution environments that allow applications 1732 to run on any operating system that includes the runtime environment. Similarly, operating system 1730 can support containers, and applications 1732 can be in the form of containers, which are lightweight, standalone, executable packages of software that include, e.g., code, runtime, system tools, system libraries and settings for an application.

Further, computer 1702 can be enable with a security module, such as a trusted processing module (TPM). For instance with a TPM, boot components hash next in time boot components, and wait for a match of results to secured values, before loading a next boot component. This process can take place at any layer in the code execution stack of computer 1702, e.g., applied at the application execution level or at the operating system (OS) kernel level, thereby enabling security at any level of code execution.

A user can enter commands and information into the computer 1702 through one or more wired/wireless input devices, e.g., a keyboard 1738, a touch screen 1740, and a pointing device, such as a mouse 1742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1704 through an input device interface 1744 that can be coupled to the system bus 1708, but can be connected by other interfaces, such as a parallel port, an IEEE 1394 serial port, a game port, a USB port, an IR interface, a BLUETOOTH® interface, etc.

A monitor 1746 or other type of display device can be also connected to the system bus 1708 via an interface, such as a video adapter 1748. In addition to the monitor 1746, a computer typically includes other peripheral output devices (not shown), such as speakers, printers, etc.

The computer 1702 can operate in a networked environment using logical connections via wired and/or wireless communications to one or more remote computers, such as a remote computer(s) 1750. The remote computer(s) 1750 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1752 is illustrated. The logical connections depicted include wired/wireless connectivity to a local area network (LAN) 1754 and/or larger networks, e.g., a wide area network (WAN) 1756. Such LAN and WAN networking environments are commonplace in offices and companies, and facilitate enterprise-wide computer networks, such as intranets, all of which can connect to a global communications network, e.g., the Internet.

When used in a LAN networking environment, the computer 1702 can be connected to the local network 1754 through a wired and/or wireless communication network interface or adapter 1758. The adapter 1758 can facilitate wired or wireless communication to the LAN 1754, which can also include a wireless access point (AP) disposed thereon for communicating with the adapter 1758 in a wireless mode.

When used in a WAN networking environment, the computer 1702 can include a modem 1760 or can be connected to a communications server on the WAN 1756 via other means for establishing communications over the WAN 1756, such as by way of the Internet. The modem 1760, which can be internal or external and a wired or wireless device, can be connected to the system bus 1708 via the input device interface 1744. In a networked environment, program modules depicted relative to the computer 1702 or portions thereof, can be stored in the remote memory/storage device 1752. It will be appreciated that the network connections shown are example and other means of establishing a communications link between the computers can be used.

When used in either a LAN or WAN networking environment, the computer 1702 can access cloud storage systems or other network-based storage systems in addition to, or in place of, external storage devices 1716 as described above, such as but not limited to a network virtual machine providing one or more aspects of storage or processing of information. Generally, a connection between the computer 1702 and a cloud storage system can be established over a LAN 1754 or WAN 1756 e.g., by the adapter 1758 or modem 1760, respectively. Upon connecting the computer 1702 to an associated cloud storage system, the external storage interface 1726 can, with the aid of the adapter 1758 and/or modem 1760, manage storage provided by the cloud storage system as it would other types of external storage. For instance, the external storage interface 1726 can be configured to provide access to cloud storage sources as if those sources were physically connected to the computer 1702.

The computer 1702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 18:
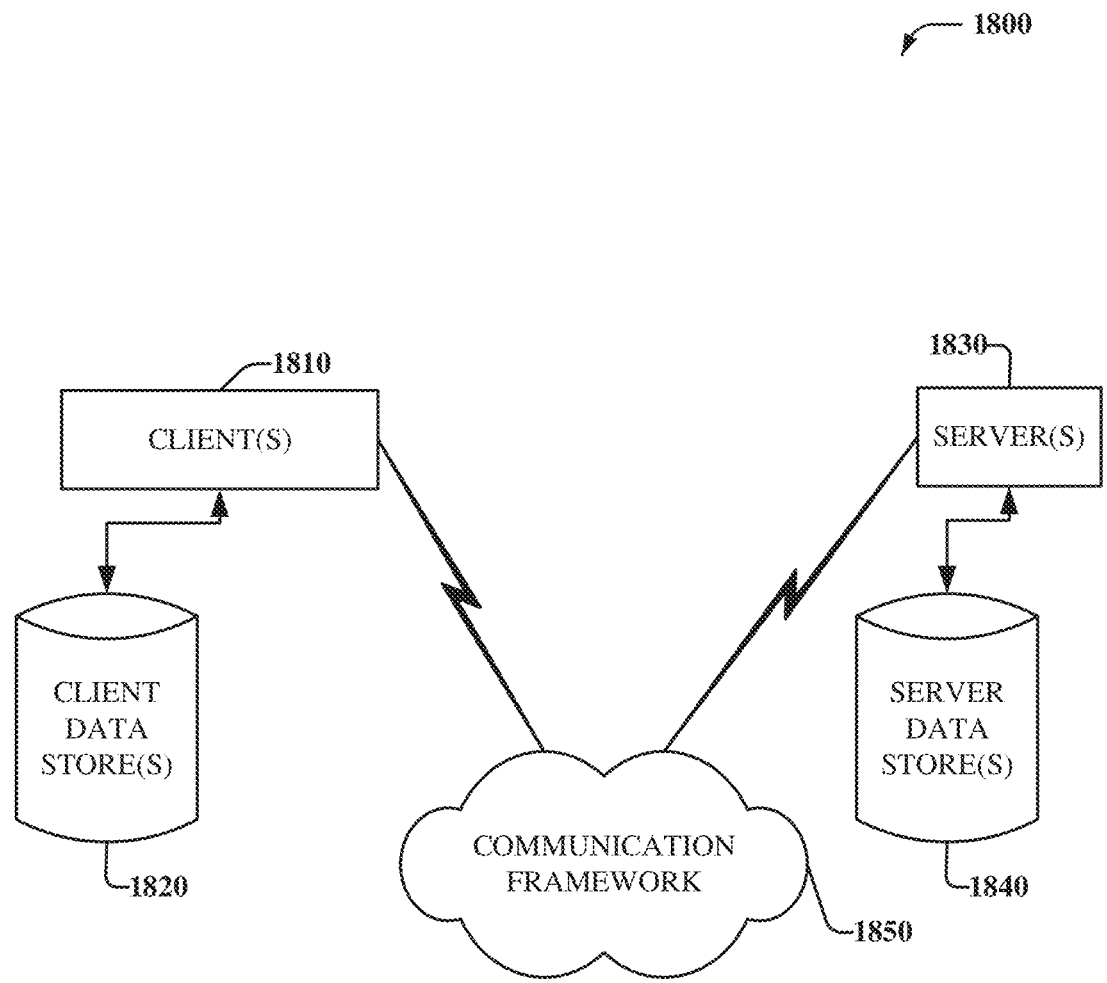
FIG. 18 illustrates an example networking environment operable to execute various implementations described herein.

FIG. 18 is a schematic block diagram of a sample computing environment 1800 with which the disclosed subject matter can interact. The sample computing environment 1800 includes one or more client(s) 1810. The client(s) 1810 can be hardware and/or software (e.g., threads, processes, computing devices). The sample computing environment 1800 also includes one or more server(s) 1830. The server(s) 1830 can also be hardware and/or software (e.g., threads, processes, computing devices). The servers 1830 can house threads to perform transformations by employing one or more embodiments as described herein, for example. One possible communication between a client 1810 and a server 1830 can be in the form of a data packet adapted to be transmitted between two or more computer processes. The sample computing environment 1800 includes a communication framework 1850 that can be employed to facilitate communications between the client(s) 1810 and the server(s) 1830. The client(s) 1810 are operably connected to one or more client data store(s) 1820 that can be employed to store information local to the client(s) 1810. Similarly, the server(s) 1830 are operably connected to one or more server data store(s) 1840 that can be employed to store information local to the servers 1830.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor that executes computer-executable components stored in a computer-readable memory, the computer-executable components comprising:
a receiver component that accesses an input image generated by an imaging device; and
a training component that trains, in a self-supervised manner based on a point spread function of the imaging device, a machine learning model to deblur the input image, along at least one axis, by a residual blur amount between the point spread function of the imaging device and a target high-resolution point spread function, and wherein the training component updates parameters of the machine learning model based on a shape difference between the point spread function of the imaging device and the target high-resolution point spread function, wherein the shape difference represents the residual blur amount.

2. The system of claim 1, wherein the training component appends one or more non-trainable convolution layers to the machine learning model, and wherein the one or more non-trainable convolution layers have a blur kernel that is based on the point spread function of the imaging device.

3. The system of claim 2, wherein the blur kernel approximates a blur corresponding to the point spread function of the imaging device, or wherein the blur kernel approximates a blur corresponding to a residual difference between the point spread function of the imaging device and the target high-resolution point spread function.

4. The system of claim 2, wherein the training component feeds the input image to the machine learning model, wherein the machine learning model generates a first output image based on the input image, wherein the one or more non-trainable convolution layers generate a second output image by convolving the first output image with the blur kernel, and wherein the training component updates the parameters of the machine learning model based on a difference between the input image and the second output image, and based on a regularizer term that includes priors of the first output image.

5. The system of claim 4, wherein the training component further feeds a low-resolution blur kernel to the machine learning model, wherein the low-resolution blur kernel approximates a blur corresponding to the point spread function of the imaging device, wherein the machine learning model generates a modified blur kernel based on the low-resolution blur kernel, wherein the one or more non-trainable convolution layers generate a pseudo-low-resolution blur kernel by convolving the modified blur kernel with the blur kernel, wherein the training component further updates the parameters of the machine learning model based on a first shape loss between the low-resolution blur kernel and the pseudo-low-resolution blur kernel, and wherein the first shape loss is defined by at least one of a full-width-half-maximum difference, a monotonicity difference, a kurtosis difference, a Fourier descriptor difference, or a wavelet descriptor difference between the low-resolution blur kernel and the pseudo-low-resolution blur kernel.

6. The system of claim 5, wherein the training component further updates the parameters of the machine learning model based on a second shape loss between the modified blur kernel and a high-resolution blur kernel that approximates a blur corresponding to the target high-resolution point spread function, and wherein the second shape loss is defined by at least one of a full-width-half-maximum difference, a monotonicity difference, a kurtosis difference, a Fourier descriptor difference, or a wavelet descriptor difference between the high-resolution blur kernel and the modified blur kernel.

7. The system of claim 2, wherein the training component appends a copy of the machine learning model to the one or more non-trainable convolution layers, wherein the training component feeds the input image to the machine learning model, wherein the machine learning model generates a first output image based on the input image, wherein the one or more non-trainable convolution layers generate a second output image by convolving the first output image with the blur kernel, wherein the copy of the machine learning model generates a third output image based on the second output image, and wherein the training component updates the parameters of the machine learning model based on a first difference between the input image and the second output image and based on a second difference between the first output image and the third output image.

8. A computer-implemented method, comprising:
accessing, by a device operatively coupled to a processor, an input image generated by an imaging device;
training, by the device and in a self-supervised manner based on a point spread function of the imaging device, a machine learning model to deblur the input image, along at least one axis, by a residual blur amount between the point spread function of the imaging device and a target high-resolution point spread function; and updating, by the device, parameters of the machine learning model based on a shape difference between the point spread function of the imaging device and the target high-resolution point spread function, wherein the shape difference represents the residual blur amount.

9. The computer-implemented method of claim 8, wherein the training the machine learning model comprises:

appending, by the device, one or more non-trainable convolution layers to the machine learning model, wherein the one or more non-trainable convolution layers have a blur kernel that is based on the point spread function of the imaging device.

10. The computer-implemented method of claim 9, wherein the blur kernel approximates a blur corresponding to the point spread function of the imaging device, or wherein the blur kernel approximates a blur corresponding to a residual difference between the point spread function of the imaging device and the target high-resolution point spread function.

11. The computer-implemented method of claim 9, wherein the training the machine learning model further comprises:

feeding, by the device, the input image to the machine learning model, wherein the machine learning model generates a first output image based on the input image, and wherein the one or more non-trainable convolution layers generate a second output image by convolving the first output image with the blur kernel; and updating, by the device, the parameters of the machine learning model based on a difference between the input image and the second output image, and based on a regularizer term that includes priors of the first output image.

12. The computer-implemented method of claim 11, further comprising:

feeding, by the device, a low-resolution blur kernel to the machine learning model, wherein the low-resolution blur kernel approximates a blur corresponding to the point spread function of the imaging device, wherein the machine learning model generates a modified blur kernel based on the low-resolution blur kernel, and wherein the one or more non-trainable convolution layers generate a pseudo-low-resolution blur kernel by convolving the modified blur kernel with the blur kernel; and updating, by the device, the parameters of the machine learning model based on a first shape loss between the low-resolution blur kernel and the pseudo-low-resolution blur kernel, and wherein the first shape loss is defined by at least one of a full-width-half-maximum difference, a monotonicity difference, a kurtosis difference, a Fourier descriptor difference, or a wavelet descriptor difference between the low-resolution blur kernel and the pseudo-low-resolution blur kernel.

13. The computer-implemented method of claim 12, further comprising:

updating, by the device, the parameters of the machine learning model based on a second shape loss between the modified blur kernel and a high-resolution blur kernel that approximates a blur corresponding to the target high-resolution point spread function, and wherein the second shape loss is defined by at least one of a full-width-half-maximum difference, a monotonicity difference, a kurtosis difference, a Fourier descriptor difference, or a wavelet descriptor difference between the high-resolution blur kernel and the modified blur kernel.

14. The computer-implemented method of claim 9, wherein the training the machine learning model further comprises:

appending, by the device, a copy of the machine learning model to the one or more non-trainable convolution layers;

feeding, by the device, the input image to the machine learning model, wherein the machine learning model generates a first output image based on the input image, wherein the one or more non-trainable convolution layers generate a second output image by convolving the first output image with the blur kernel, and wherein the copy of the machine learning model generates a third output image based on the second output image; and updating, by the device, the parameters of the machine learning model based on a first difference between the input image and the second output image and based on a second difference between the first output image and the third output image.

15. A computer program product for facilitating self-supervised deblurring, the computer program product comprising a computer-readable memory having program instructions embodied therewith, the program instructions executable by a processor to cause the processor to:

access an input image generated by an imaging device;

train, in a self-supervised manner based on a point spread function of the imaging device, a machine learning model to deblur the input image, along at least one axis, by a residual blur amount between the point spread function of the imaging device and a target high-resolution point spread function; and update parameters of the machine learning model based on a shape difference between the point spread function of the imaging device and the target high-resolution point spread function, wherein the shape difference represents the residual blur amount.

16. The computer program product of claim 15, wherein the processor trains the machine learning model by:

appending one or more non-trainable convolution layers to the machine learning model, wherein the one or more non-trainable convolution layers have a blur kernel that is based on the point spread function of the imaging device.

17. The computer program product of claim 16, wherein the blur kernel approximates a blur corresponding to the point spread function of the imaging device, or wherein the blur kernel approximates a blur corresponding to a residual difference between the point spread function of the imaging device and the target high-resolution point spread function.

18. The computer program product of claim 16, wherein the processor trains the machine learning model by:

feeding the input image to the machine learning model, wherein the machine learning model generates a first output image based on the input image, and wherein the one or more non-trainable convolution layers generate a second output image by convolving the first output image with the blur kernel; and updating the parameters of the machine learning model based on a difference between the input image and the second output image, and based on a regularizer term that includes priors of the first output image.

19. The computer program product of claim 18, wherein the processor further trains the machine learning model by:
- feeding a low-resolution blur kernel to the machine learning model, wherein the low-resolution blur kernel approximates a blur corresponding to the point spread function of the imaging device, wherein the machine learning model generates a modified blur kernel based on the low-resolution blur kernel, and wherein the one or more non-trainable convolution layers generate a pseudo-low-resolution blur kernel by convolving the modified blur kernel with the blur kernel; and
- updating the parameters of the machine learning model based on a first shape loss between the low-resolution blur kernel and the pseudo-low-resolution blur kernel, and wherein the first shape loss is defined by at least one of a full-width-half-maximum difference, a monotonicity difference, a kurtosis difference, a Fourier descriptor difference, or a wavelet descriptor difference between the low-resolution blur kernel and the pseudo-low-resolution blur kernel.

20. The computer program product of claim 19, wherein the processor further trains the machine learning model by:
- updating the parameters of the machine learning model based on a second shape loss between the modified blur kernel and a high-resolution blur kernel that approximates a blur corresponding to the target high-resolution point spread function, and wherein the second shape loss is defined by at least one of a full-width-half-maximum difference, a monotonicity difference, a kurtosis difference, a Fourier descriptor difference, or a wavelet descriptor difference between the high-resolution blur kernel and the modified blur kernel.

* * * * *